(12) United States Patent
Kusunoki et al.

(10) Patent No.: US 8,886,014 B2
(45) Date of Patent: Nov. 11, 2014

(54) VIDEO RECORDING APPARATUS, SCENE CHANGE EXTRACTION METHOD, AND VIDEO AUDIO RECORDING APPARATUS

(75) Inventors: Yoshiaki Kusunoki, Tokyo (JP); Isao Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1210 days.

(21) Appl. No.: 11/989,309

(22) PCT Filed: Mar. 17, 2006

(86) PCT No.: PCT/JP2006/305337
§ 371 (c)(1),
(2), (4) Date: Jan. 24, 2008

(87) PCT Pub. No.: WO2007/017970
PCT Pub. Date: Feb. 15, 2007

(65) Prior Publication Data
US 2009/0034937 A1 Feb. 5, 2009

(30) Foreign Application Priority Data

Aug. 11, 2005 (JP) ................. 2005-232948
Aug. 11, 2005 (JP) ................. 2005-232957

(51) Int. Cl.
*H04N 9/82* (2006.01)
*H04N 19/60* (2014.01)
(Continued)

(52) U.S. Cl.
CPC ....... *H04N 9/8205* (2013.01); *H04N 19/00775* (2013.01); *H04N 21/44008* (2013.01); *H04N 19/00921* (2013.01); *H04N 21/84* (2013.01); *H04N 21/812* (2013.01); *G11B 27/28* (2013.01); *H04N 21/8455* (2013.01); *H04N 9/8042* (2013.01); *H04N 5/781* (2013.01); *H04N 21/8456* (2013.01); *H04N 21/4334* (2013.01)
USPC ............. 386/249; 386/250; 386/251

(58) Field of Classification Search
CPC ........... H04N 9/8205; H04N 21/4334; H04N 21/44008; H04N 21/8455; H04N 21/8456; H04N 21/812; H04N 19/00775; H04N 19/00921; H04N 9/8042; H04N 5/781; G11B 27/28; H94N 21/84
USPC ......................................... 386/249, 250, 251
See application file for complete search history.

(56) References Cited

U.S. PATENT DOCUMENTS 5,696,866 A * 12/1997 Iggulden et al. ............. 386/249
5,974,220 A * 10/1999 Kajimoto ..................... 386/278
(Continued)

FOREIGN PATENT DOCUMENTS

EP    1 768 419 A1    3/2007
JP    8-507633 A    8/1996
(Continued)

*Primary Examiner* — Jeffrey D Popham
(74) *Attorney, Agent, or Firm* — Birch, Stewart, Kolasch & Birch, LLP

(57) ABSTRACT

There are provided with a video recording apparatus and a scene change extraction method, by which a scene change can be extracted from a video while recording the video. The video recording apparatus 100 includes an encoder 101 for encoding video data $P_{IN}$, an HDD 105 for storing an encoded stream outputted from the encoder 101, a stream controller 103 for transferring the encoded stream outputted from the encoder 101 to the HDD 105, a scene change extractor 110 for decoding the encoded stream outputted from the encoder 101 and extracting a scene change in the decoded video data, and a recording controller 102 for receiving an encoding-completion notification $I_{EN}$ on a unit-of-encoding basis of the encoded stream from the encoder 101 and outputting a scene change extraction instruction $C_{SC}$ to the scene change extractor 110.

8 Claims, 22 Drawing Sheets

(51) Int. Cl.
*H04N 21/44* (2011.01)
*H04N 19/87* (2014.01)
*H04N 21/84* (2011.01)
*H04N 21/81* (2011.01)
*G11B 27/28* (2006.01)
*H04N 21/845* (2011.01)
*H04N 9/804* (2006.01)
*H04N 21/433* (2011.01)
*H04N 5/781* (2006.01)

(56) References Cited

U.S. PATENT DOCUMENTS

| | | | |
|---|---|---|---|
| 6,154,601 A * | 11/2000 | Yaegashi et al. | 386/282 |
| 6,449,021 B1 | 9/2002 | Ohta et al. | |
| 2002/0015574 A1 | 2/2002 | Suito et al. | |
| 2003/0091323 A1 * | 5/2003 | Abe et al. | 386/46 |
| 2005/0163480 A1 * | 7/2005 | Takemoto | 386/69 |
| 2009/0034937 A1 | 2/2009 | Kusunoki et al. | |

FOREIGN PATENT DOCUMENTS

| | | |
|---|---|---|
| JP | 10-276388 A | 10/1998 |
| JP | 2000-165796 A | 6/2000 |
| JP | 2000-286715 A | 10/2000 |
| JP | 2002-10254 A | 1/2002 |
| JP | 2002-027401 | 1/2002 |
| JP | 2002-64823 A | 2/2002 |
| JP | 2002-247516 | 8/2002 |
| JP | 2003-47031 A | 2/2003 |
| JP | 2003-514331 A | 4/2003 |
| JP | 2004-282318 A | 10/2004 |
| JP | 2005-175710 A | 6/2005 |
| JP | 2005-232948 | 7/2006 |
| JP | 3827705 B1 | 9/2006 |
| JP | 3894940 B2 | 3/2007 |
| WO | WO-98/41978 A1 | 9/1998 |
| WO | WO 01/35409 A2 | 5/2001 |
| WO | WO 2005/125217 A1 | 12/2005 |

\* cited by examiner

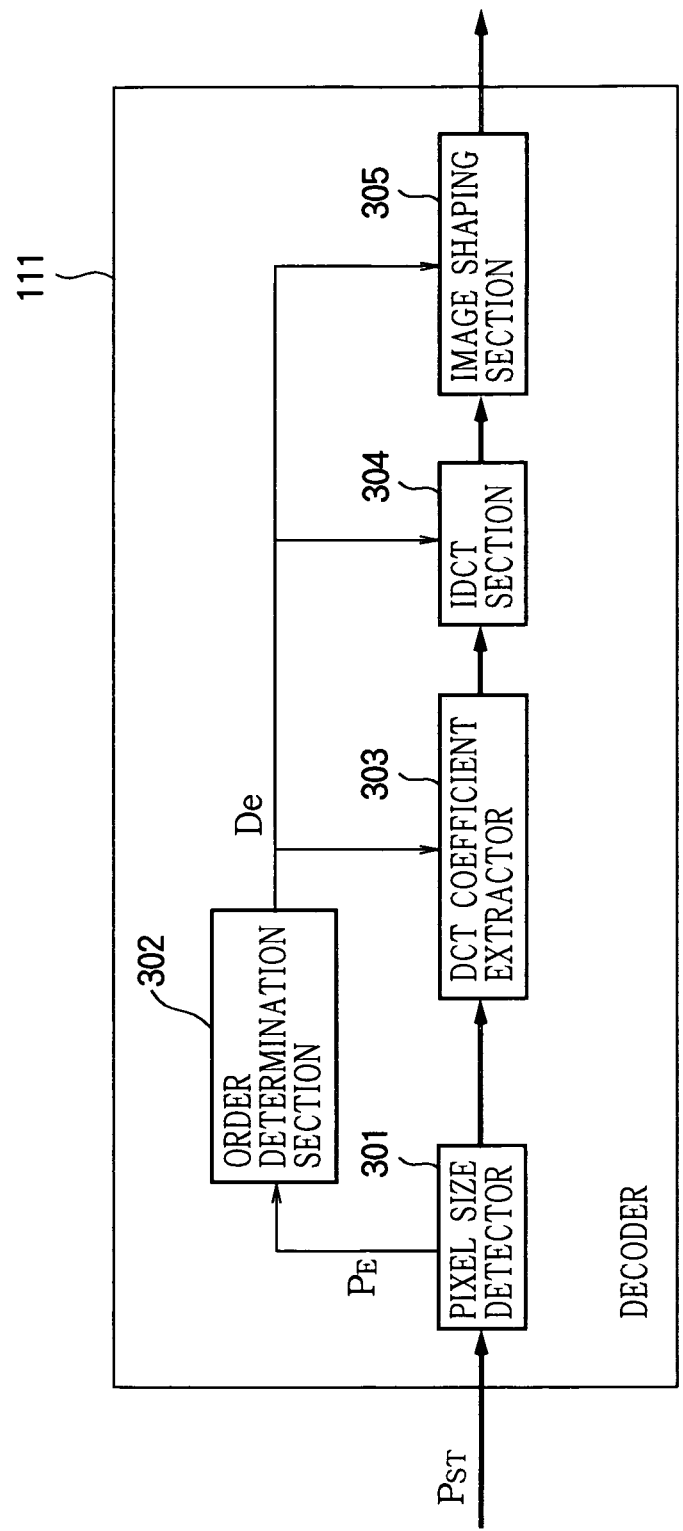

FIG.14

CHANGEOVER-POINT STACK TABLE 18

| CHANGEOVER-POINT GOP NUMBER | LINK-END GOP NUMBER | CHANGEOVER-POINT COUNTER | SILENCE TIME LENGTH (ms) | SCENE CHANGE DIFFERENCE VALUE (VALUE OF 0-1) | VALID/INVALID FLAG | CHANGEOVER-POINT IN FIG.15C |
|---|---|---|---|---|---|---|
| '6' | '6' | 1 | 300 | 0.75 | 1 | 33a |
| '10' | '101' | 3 | 420 | 0.94 | 1 | 33b |
| '40' | '40' | 1 | 1320 | 0.88 | 0 | 33c |
| '62' | '62' | 1 | 830 | 0.88 | 1 | 33d |
| '83' | '83' | 1 | 1560 | 0.93 | 1 | 33e |
| '101' | '101' | 1 | 1200 | 0.83 | 0 | 33f |
| '130' | '130' | 1 | 360 | 0.96 | 1 | 33g |
| '179' | '179' | 1 | 1132 | 0.84 | 1 | 33h |
| '331' | '331' | 1 | 632 | 0.78 | 1 | 33i |

VIDEO RECORDING APPARATUS, SCENE CHANGE EXTRACTION METHOD, AND VIDEO AUDIO RECORDING APPARATUS

TECHNICAL FIELD

The present invention relates to a video recording apparatus capable of detecting a scene change in a video while recording the video and a scene change extraction method performed by the video recording apparatus. The present invention also relates to a video audio recording apparatus capable of detecting a commercial message broadcast between program main parts in a television broadcast program which is being recorded while recording the television broadcast program.

BACKGROUND ART

Conventionally, when a user searches for a desired image scene from recorded video data in a video recording apparatus for encoding and recording video data, the user visually searches for a target image scene by using special reproduction such as fast-forwarding or fast-reversing. This requires a lot of time and work of the user.

In order to solve such problem, methods of searching for a scene transition (hereinafter referred to as a "scene change") in a video have been proposed (e.g., see Patent Documents 1 and 2). Patent Document 1 discloses a method, in which a video signal processing apparatus at a stage previous to an encoder for encode processing calculates an absolute value of a difference between histograms of two pictures adjacent to each other in time and determines that a scene change takes place when the calculated absolute value exceeds a predetermined threshold value. Further, Patent Document 2 discloses a method, in which the video data that have already been stored in a storage medium of an HDD are read to extract a scene change.

Further, television broadcasts can be classified into a "program main part broadcast" and a "commercial message broadcast" on the basis of their contents. In the case of a movie program, the program main part broadcast is a broadcast portion based on the video audio data of a movie content itself. On the other hand, the commercial message broadcast is a broadcast portion based on the video audio data supplied by a client such as an advertiser, an advertisement agent, or the like, who exchanges contracts with a broadcasting company, and is broadcasted during time between the program main part broadcasts. Furthermore, the commercial message broadcast includes a broadcast portion which is broadcasted by a broadcasting company in order to advertise and publicize its own company. In the present application, the "program main part broadcast" is also referred to as a "program main part", and the "commercial message broadcast" is also referred to as a "CM broadcast". The relationship between contents of the program main part and the CM broadcast tends to be slight. Therefore, a viewer who wants to concentrate his energies on watching the program main parts has a desire that an apparatus effectively removes the CM broadcasts when the television broadcast is recorded or an apparatus skips the CM broadcasts when the television broadcast is viewed.

A conventional video audio recording apparatus detects an audio scheme of a television broadcast, and discriminates between a program main part and a CM broadcast based on the detected audio scheme. An audio scheme of the program main part tends to be a monophonic sound or a bilingual sound (e.g., Japanese and English in a foreign film), while an audio scheme of the CM broadcast generally tends to be a stereophonic sound. Using such difference, the apparatus determines that a period of time when a stereophonic sound is detected is a CM broadcast period, does not record (i.e., removes) video data of a CM broadcast period during video recording, and avoids watching (i.e., skips) a CM broadcast during video viewing.

The above-mentioned conventional CM detection method is useless when the audio scheme of the program main part is the same as the audio scheme of the CM broadcast, i.e., a stereophonic sound. To resolve this problem, there is provided with a proposal of detecting a frame picture of a whole black frame referred to as a "black frame" that is inserted in a boundary between a program main part and a CM broadcast, thereby identifying a CM broadcast period (e.g., see Patent Document 3). Further, there is provided with a proposal of detecting a silence period which appears in a boundary between a program main part and a CM broadcast, thereby identifying a CM broadcast period based on an interval between occurrences of the detected silence periods (e.g., see Patent Document 4). Furthermore, there is provided with a proposal of extracting a CM broadcast using an occurrence frequency of a scene change in a video (see Patent Document 5). Moreover, there is provided with a proposal of a user interface used to avoid watching (i.e., skip) a fixed period of time such as 15 seconds by user's button operation during video viewing.

Patent Document 1 is Japanese Patent Application Kokai (Laid-Open) Publication No. 2004-282318 (page 7, FIG. 2);

Patent Document 2 is Japanese Patent Application Kokai (Laid-Open) Publication No. 2002-064823 (page 5, FIG. 1);

Patent Document 3 is Japanese Patent Kohyo (Japanese Translation of International Patent Application) H8-507633 (pages 12-15, FIG. 1);

Patent Document 4 is Japanese Patent Application Kokai (Laid-Open) Publication No. 2003-47031 (pages 5-8, FIG. 1); and Patent Document 5 is Japanese Patent Application Kokai (Laid-Open) Publication No. 2000-165796 (page 7, FIG. 14).

DISCLOSURE OF THE INVENTION

Problems to be Solved by the Invention

However, since the method shown in Patent Document 1 is a method, in which a video signal processing apparatus at a stage previous to an encoder detects a scene change, this method cannot be applied to a video recording apparatus including an encoder chip set which is a single unit containing components from a video encoder to an encoder and does not output a result of the extracting of a scene change to the outside. Further, even if an encoder chip set outputs a result of the extracting of a scene change, since the result of the extracting of a scene change changes every time a type of the used encoder chip set changes, there is a problem that an adjustment in the video recording apparatus is required every time a type of the encoder chip set changes.

Further, since the method shown in Patent Document 2 is a method, in which a scene change is detected in a video stream that has already been compressed and stored in the HDD, this method requires to perform offline operation which needs a lot of time after completion of the recording processing. Therefore this method is not practical.

Furthermore, in the method shown in Patent Document 3 which uses detection of the black frames to identify the CM broadcast period, since the black frames are not inserted in some countries or areas, or some broadcasting companies (in practice, the Japanese law does not require insertion of the black frames in a domestic broadcasting in Japan), there is a problem that an accuracy of the automatic detection of the CM broadcast period is not enough high.

Moreover, in the method shown in Patent Document 4 or 5, since a lot of silence periods and scene changes exist in the program main part, there is a problem that it is difficult to identify the CM broadcast period with high accuracy.

In addition, in the method using a fifteen-second-skip by user's button operation, there is a problem that this method cannot be applied to a CM broadcast having a time length other than a prescribed time length series, i.e., having a time length that is not an integer multiple of 15 seconds (e.g., a program spot advertisement for 5 seconds).

The present invention has been made in order to solve the above-mentioned problems of the conventional arts, and an object of the present invention is to provide a video recording apparatus capable of extracting a scene change in a video while recording the video and a scene change extraction method performed by the video recording apparatus. Further, another object of the present invention is to provide a video audio recording apparatus capable of extracting a CM broadcast period while recording the television broadcast program.

Means of Solving the Problem

According to the present invention, a video recording apparatus includes an encode means which encodes video data to output an encoded stream; a record means which records the encoded stream outputted from the encode means; a stream control means which transfers the encoded stream outputted from the encode means to the record means; an image-change-point extraction means which decodes the encoded stream outputted from the encode means and extracts a scene change in video data of the decoded stream; and a video recording control means which receives an encoding-completion notification on a unit-of-encoding basis of the encoded stream from the encode means, the video recording control means outputting a scene change extraction instruction to the image-change-point extraction means when receiving the encoding-completion notification.

Further, according to the present invention, a scene change extraction method includes the steps of: encoding, by an encode means, video data to output an encoded stream; transferring, by a stream control means, the encoded stream to record the encoded stream in a record means; receiving an encoding-completion notification on a unit-of-encoding basis of the encoded stream and outputting a scene change extraction instruction to the image-change-point extraction means when receiving the encoding-completion notification, by a video recording control means; and decoding the encoded stream outputted from the encode means and extracting a scene change in video data of the decoded stream, by an image-change-point extraction means.

According to the present invention, a video audio recording apparatus includes an encode means which encodes input video data and audio data to output an encoded stream; a record means which records the encoded stream outputted from the encode means; an image-change-point extraction means which decodes the encoded stream outputted from the encode means and detects a scene change in video from the decoded data; a silence detection means which detects a silence period from the audio data; a changeover-point detection means which detects a changeover-point, at which both the scene change detected by the image-change-point detection means and the silence period detected by the silence detection means occur at the same time; a CM-broadcast-period determination means which judges a period of time when two or more combinations of the changeover-points are successively detected as a CM broadcast period, an interval of the changeover-points detected by the changeover-point detection means being within a predetermined time range, a central part of which is a predetermined reference period of time; and a CM-broadcast-period-information record means which records time information of the CM broadcast period determined by the CM-broadcast-period determination means.

Effects of the Invention

In the video recording apparatus and the scene change extraction method of the present invention, since the extracting processing of a scene change is performed every time the video data is encoded, the present invention has an effect that the scene change can be extracted in real time.

In the video audio recording apparatus of the present invention, since the detecting processing of a CM broadcast period is performed while a broadcast program is being recorded, the present invention has an effect that the CM broadcast period can be detected in real time.

BRIEF DESCRIPTION OF THE DRAWINGS

FIG. 7 is a block diagram showing a configuration of a decoder of a video recording apparatus according to the third embodiment of the present invention;

FIG. 14 is a diagram showing an example of a changeover-point stack table of the video audio recording apparatus according to the sixth embodiment;

Figure 1:
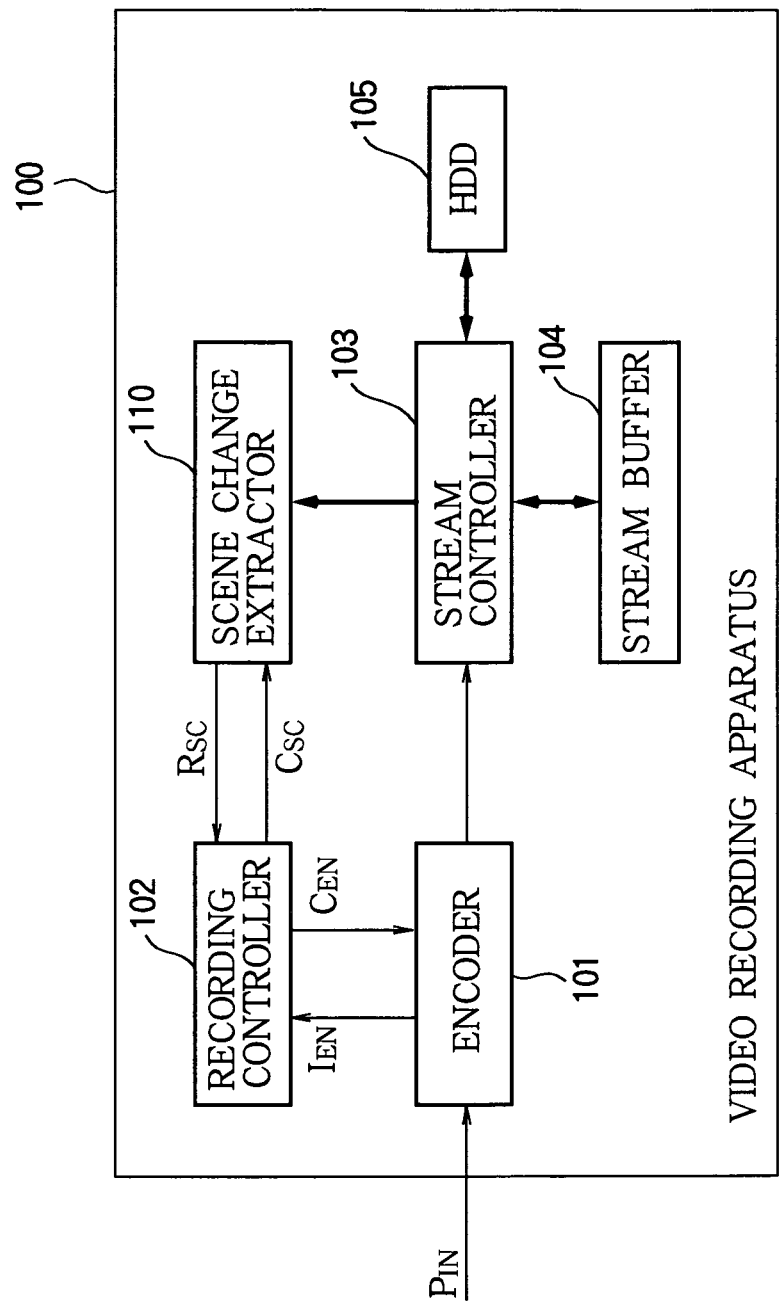
FIG. 1 is a block diagram showing a configuration of a video recording apparatus according to the first embodiment of the present invention.

EXPLANATION OF REFERENCE NUMERALS AND SYMBOLS 100 video recording apparatus; 101 encoder; 102 recording controller; 103 stream controller; 104 stream buffer; 105 HDD, 110 scene change extractor; 111 decoder; 112 histogram generator; 113 first histogram buffer; 114 second histogram buffer; 115 difference extractor; 116 scene change determination section; 120 scene change command controller; 121 API section; 122 command buffer; 123 scene change extraction result buffer; 124 state controller; 301 pixel size detector; 302 order determination section; 303 DCT coefficient extractor; 304 IDCT section 305 image shaping section; 306 slice-to-be-used determination section; 307 header detector; 308 inverse quantizer; 1 antenna; 2 tuner; 3 video A-D converter; 4 audio A-D converter; 5 video encoder; 6 audio encoder; 7 multiplexer (Mux); 8 recording controller; 9 stream controller; 10 file system section; 11 HDD; 12 navigation section; 13 scene change detector; 14 silence detector; 15 changeover-point detector; 16 CM filter; 17 stream buffer; 18 changeover-point stack table; 19 changeover-point matching buffer; 20 video audio recording apparatus; 31a, ..., 31m silence period; 32a, ..., 32o scene change; 33a, ..., 33i changeover-point; 34a, ..., 34c detected CM; 35 detected CM broadcast period; 51a changeover-point in time of transition from program main part to CM broadcast period; 51b, ..., 51e changeover-point between CMs; 51f changeover-point in time of transition from CM broadcast period to program main part.

BEST MODE FOR CARRYING OUT THE INVENTION

First Embodiment

FIG. 1 is a block diagram showing a configuration of a video recording apparatus 100 according to the first embodiment of the present invention. As shown in FIG. 1, the video recording apparatus 100 includes an encoder 101 as an encode means which encodes video data inputted from a tuner, not shown, or from the outside in conformity with MPEG-2 (Moving Picture Experts Group), an HDD (hard-disk drive) 105 as a record means in which an encoded stream generated by the encoder 101 is recorded, and a stream controller 103 as a stream control means which performs a stream control for writing/reading an encoded stream in/from the HDD 105 in a stable manner. Further, the video recording apparatus 100 includes a stream buffer 104 as a temporary storage means which temporarily stores the encoded stream, a recording controller 102 as a recording control means which outputs an instruction for start/stop of the encoding to the encoder 101, and a scene change extractor 110 as an image-change-point extraction means which extracts a scene change from the encoded stream generated by the encoder 101. Although the HDD 105 is shown as the record means in FIG. 1, the record means may be other information recording medium, for example, an optical disk such as a DVD, a magnetic tape, and so on. Furthermore, the video recording apparatus 100 may be a DVD/HDD hybrid recorder. Moreover, the video recording apparatus 100 is not limited to a video recorder intended for home use, it can be applicable for apparatuses used for various purposes, for example, a personal computer, a video server, a surveillance recorder for a surveillance system, and so on.

The MPEG-2 as an encoding scheme of the encoder 101 is compatible with variable rate, and therefore the code amount generated for one second (bit rate) changes greatly with reference to time. For this reason, the stream controller 103 causes the stream buffer 104 to temporarily hold the encoded stream and performs writing of the encoded stream in the HDD 105 and reading of the encoded stream from the HDD 105 in accordance with a state of the HDD 105, in such a way that data writing in the HDD 105 or data reading from the HDD 105 does not lead to overflow or underflow of the encoded stream. The stream buffer 104 includes a ring buffer, and an effective data area is managed by a write position pointer and a read position pointer. In other words, during time of data writing, data of a certain data size is written in an area from a start position indicated by the write position pointer, and the write position pointer advances on the basis of the written data size. On the other hand, during time of data reading, data of a certain data size is read from a start position indicated by the read position pointer, and the read position pointer advances on the basis of the read data size. When the pointers reach an end position of the ring buffer, the pointers return to a start position of the ring buffer.

Figure 2:
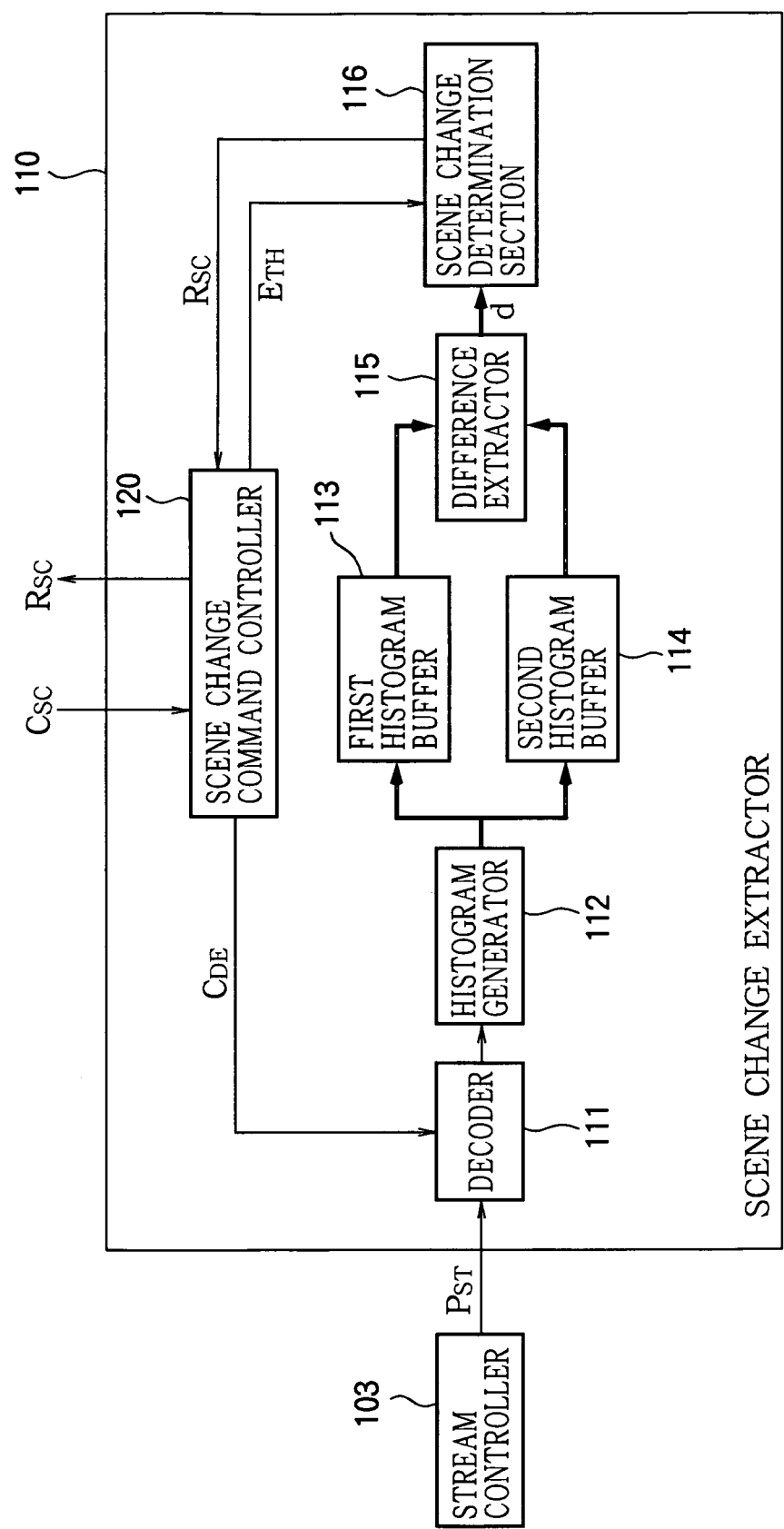
FIG. 2 is a block diagram showing a configuration of a scene change extractor of the video recording apparatus according to the first embodiment.

FIG. 2 is a block diagram showing a configuration of a scene change extractor 110 shown in FIG. 1. As shown in FIG. 2, the scene change extractor 110 includes a decoder 111 as a decode means which decodes the inputted encoded stream, a histogram generator 112 as a histogram generation means which generates a histogram of the decoded video data, a first histogram buffer 113 and a second histogram buffer 114 which hold a histogram generated by the histogram generator 112, and a difference extractor 115 as a difference extraction means which calculates a difference between the histogram held in the first histogram buffer 113 and the histogram held in the second histogram buffer 114. Further, the scene change extractor 110 includes a scene change determination section 116 as a scene change determination means which compares a difference value obtained by the difference extractor 115 with a previously established threshold value, and a scene change command controller 120 as a scene change command control means which controls the scene change extractor 110 in accordance with a control signal such as a scene change extraction start instruction outputted from the recording controller 102.

Next, the recording processing of the video recording apparatus 100 will be described. When the recording is started, the recording controller 102 outputs a control signal $C_{EN}$ to the encoder 101 to instruct the encoding start, and the encoder 101 starts the encoding processing of the inputted video data $P_{IN}$. The encoder 101 sends an encoding-completion notification $I_{EN}$ of a GOP to the recording controller 102 every time the encoding of a GOP (Group of Pictures) as a unit-of-encoding is completed, for example. The stream controller 103 writes the encoded stream encoded by the encoder 101 in the stream buffer 104 successively in such a way that the encoded stream is written in an area from a position of the write position pointer in the stream buffer 104. On the other hand, while checking that the HDD 105 is in a writable state, the stream controller 103 reads the encoded stream from a position of the read position pointer in the stream buffer 104 to write it in the HDD 105. During execution of the recording, the above-mentioned processing is repeated. In time of the recording completion, the recording controller 102 instructs the encoding stop to the encoder 101, and then the encoder 101 stops the encoding processing. The stream controller 103 writes all encoded stream remaining in the stream buffer 104 in the HDD 105.

Next, a scene change extraction method during video recording will be described. For example, the recording controller 102 supplies a command $C_{SC}$ for extracting a scene change to the scene change extractor 110, every time it receives an encoding-completion notification $I_{EN}$ of a GOP from the encoder 101. The command $C_{SC}$ for extracting a scene change is supplied as a decoding start command $C_{DE}$ through the scene change controller 120 in the scene change extractor 110 to the decoder 111. The decoder 111 reads the encoded stream $P_{ST}$ through the stream controller 103 from the stream buffer 104 and then starts the decoding. The video data decoded from the MPEG-2 to the YUV by the decoder 111 is supplied to the histogram generator 112, and the histogram generator 112 generates a histogram based on a count of each section of the YUV of the video data. A sectionalization for generating a histogram is, for example, a method of dividing a possible range at regular intervals or a method of dividing a range into sections in accordance with a result of comparison with a plurality of threshold values previously obtained. Further, in the above example, a case where the histograms are generated for all components, i.e., the luminance component Y and the color difference components U and V, has been described, but a method in which the histogram is generated for only the luminance component Y may be adopted. Furthermore, a method in which the histograms are generated for all components, i.e., the luminance component Y and the color difference components U and V and weights are assigned to the color difference components U and V to increase the section size may be adopted. Moreover, a method of sectionalization for generating a histogram is not limited to the above-described example, and other methods of sectionalization may be adopted.

The histogram generated by the histogram generator 112 is alternately held in the first histogram buffer 113 or the second histogram buffer 114. The difference extractor 115 compares the current video data with the immediately previous video data (e.g., compares the video data of the current frame with the video data of the frame previous by one frame) using the histograms alternately held in the first histogram buffer 113 or the second histogram buffer 114, thereby obtaining a difference value. A method of obtaining the difference value of two histograms is, for example, a method of accumulating differences between values of all corresponding components of the two histograms. When the i-th picture histogram is represented by $H_i$ and $H_i = \{h_i(1), h_i(2), \ldots, h_i(K)\}$ the difference value 'd' between the i-th picture histogram $H_i$ and the immediately previous (i−1)-th picture histogram $H_{i-1}$ is obtained by the following equation. Further, K is a predetermined positive integer.

$$d = \frac{1}{N} \times \sum_{k=1}^{K} |h_i(k) - h_{i-1}(k)|$$

where N represents number of pixels in one frame. Therefore, the difference value 'd' is a value ranging from 0 to 1. If a picture of the i-th frame is the same as a picture of the (i−1)-th frame, the difference value 'd' becomes a value of 0. If a difference between the picture of the i-th frame and the picture of the (i−1)-th frame is large, the difference value 'd' approaches a value of 1.

The difference value 'd' obtained by the difference extractor 115 is sent to the scene change determination section 116, and is compared with a threshold value $E_{TH}$ set in advance by the scene change command controller 120. If the difference value 'd' is larger than the set threshold value $E_{TH}$, the judging of a scene change is made and the judgment result $R_{SC}$ is sent to the scene change command controller 120. Furthermore, in time of ending of the video recording and the like, the judgment result $R_{SC}$ is sent to the recording controller 102.

As has been described above, the judging of the scene change by the scene change extractor 110 is performed successively every time the encoding of a GOP by the encoder 101 is completed (i.e., in synchronism with the completion of the encoding of a GOP in the first embodiment) during a period of time from a start of video recording to an end of video recording. By virtue of this, a scene change in the video stream $P_{ST}$ can be extracted while recording the video stream $P_{ST}$. In other words, since the extracting processing of a scene change is performed every time the encoding of a GOP as a minimum unit-of-encoding is completed, the extracting of a scene change can be performed in parallel with the encoding.

Further, since the extracting of a scene change is performed in real time, an encoder without a function of scene change extraction can be adopted as the encoder 101. Accordingly, since it is possible to select an encoder without a function of scene change extraction when an encoder incorporated in the video recording apparatus is selected, a range of choice of the encoder is extended and an encoder can be selected with emphasis on cost and easy availability.

Furthermore, in the method of extracting a scene change by analyzing the encoded stream already stored in the HDD and the like, time is required to read the encoded stream from the HDD as the recording device in addition to time for analyzing a scene change. However, in the video recording apparatus 100 of the first embodiment, since the stream is read from the stream buffer 104 (a volatile semiconductor memory in general) which has higher writing rate and reading rate than the HDD 105 and temporarily stores the stream, the stream can be read at high speed and as a result processing time can be reduced.

Moreover, since the scene change extractor 110 is not influenced by the operation of the encoder 101, even if a type or specification of the encoder is changed, a criterion for extraction of a scene change can be kept within a constant range.

Further, the video recording apparatus of the first embodiment has not only a function of extracting a scene change in parallel with the video recording but also a function of directly analyzing the encoded stream. Therefore, the extracting of a scene change in the encoded stream directly recorded in the HDD can be performed by reading the encoded stream via the stream controller 103.

Furthermore, it is possible not to use a function of the scene change in an encoder chip generally composed of hardware but to use the function realized by only firmware. Therefore, the algorithm of the extracting of a scene change can be changed comparatively easily and the state transition or the threshold value in the extracting processing of a scene change can be changed dynamically in accordance with the state of the video recording reproducing apparatus and the like.

For example, another method of controlling the apparatus can be adopted in such a way that a scene change in the CM video data is not detected by making the threshold value $E_{TH}$ used for judging the scene change larger while the input video data is CM video data, thereby causing it difficult to judge the video as a scene change.

Moreover, a control method of improving detection accuracy of a scene change can be adopted, wherein attention is focused on that a moment in time at which an audio signal becomes a silence signal exists in the scene change, and when the audio signal is a silence signal (i.e., a level of the audio signal is lower than a predetermined threshold value), a threshold value $E_{TH}$ used for the judging of the scene change is made to be lower and a scene change is detected based on not only the video data but also the audio data.

Further, in the above description, a case where a unit-of-extracting of a scene change is one GOP has been described, but a unit-of-extracting of a scene change may be a plurality of GOPs. Furthermore, a unit-of-extracting of a scene change may be one or a plurality of slices or one or a plurality of macroblocks.

Moreover, in the above-mentioned description, a case where the decoding processing is performed by software has been described, but it may be performed by hardware.

Second Embodiment

A video recording apparatus according to the second embodiment of the present invention is different from the video recording apparatus according to the first embodiment only in respects of the configuration and operation of the scene change command controller 120 shown in FIG. 2. Therefore, the second embodiment will be described also with reference to FIG. 1 and FIG. 2.

When the video recording is performed in parallel with the extracting of a scene change, the video recording apparatus of the second embodiment performs the extracting of a scene change in asynchronism with the encoding processing of a GOP. This encoding processing performed asynchronously is also simply referred to as "asynchronous processing". This asynchronous processing can be performed even if a start timing of the extracting processing of a scene change for a GOP, the encoding processing of which has been completed by the encoder 101, does not coincide with an end timing of the encoding processing. In practical operation of the asynchronous processing for a certain GOP, the extracting processing of a scene change is not performed immediately after the encoding processing is completed, but the extracting processing of a scene change is performed after a while after the encoding processing is completed.

In general, in a video recording apparatus, for example, an HDD/DVD hybrid recorder and the like, operation such as reproduction or dubbing that causes load of the CPU to be increased may be performed in parallel with the video recording. Further, operation performed by a user at irregular intervals, for example, opening of a DVD tray, display of a function setting screen, reading of an electric program guide table, and the like, causes load of the CPU to be increased temporarily. When the load of the CPU increases due to such operations, the CPU cannot be always occupied by the extracting of a scene change, and it is often desirable to delay the extracting processing of a scene change until other processing is finished. On the other hand, a function of the video recording as a basic function of the apparatus should not be interrupted by the extracting processing of a scene change, and therefore it is desirable that the extracting processing of a scene change should have lower priority than the recording processing. In order to implement such function, the video recording apparatus of the second embodiment is configured so as to be able to perform the extracting processing of a scene change in asynchronism with the video recording processing.

Figure 3:
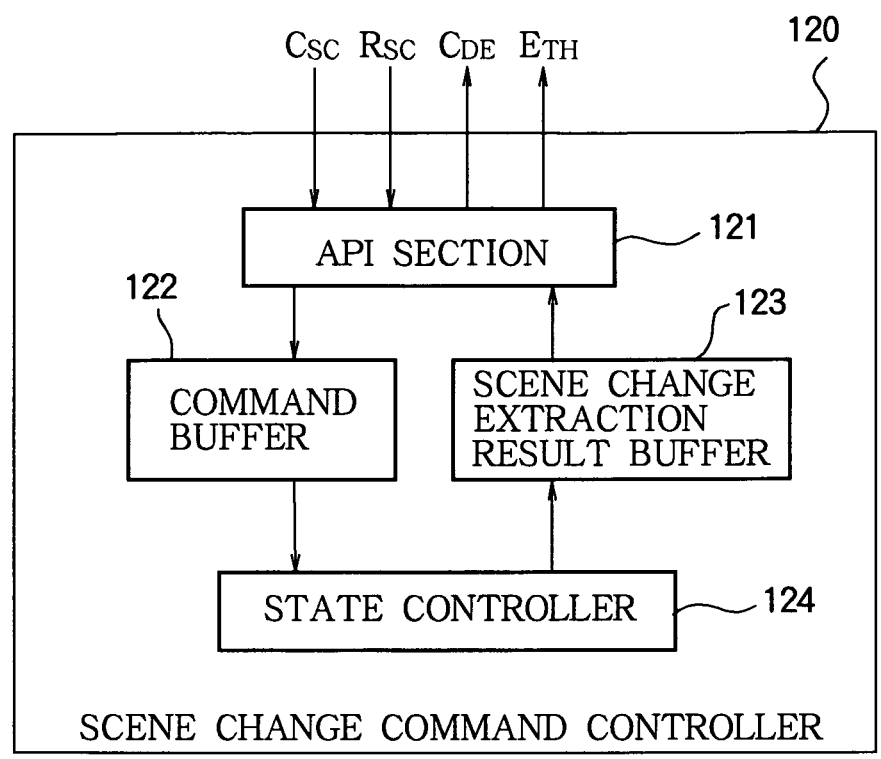
FIG. 3 is a block diagram showing a configuration of a scene change command controller of a video recording apparatus according to the second embodiment of the present invention.

FIG. 3 is a block diagram showing a configuration of the scene change command controller 120 (shown in FIG. 2) in the video recording apparatus according to the second embodiment. As shown in FIG. 3, the scene change command controller 120 includes an API (application program interface) section 121 which receives a command from the recording controller 102, a command buffer 122 which holds a plurality of received commands, a state controller 124 which performs state transition of the scene change extractor to perform processing of the received command, and a scene change extraction result buffer 123 which holds a result of the extracting of a scene change and an error state and return them to the recording controller 102. The video recording apparatus of the second embodiment is different from the video recording apparatus of the first embodiment in a respect that a command for extracting a scene change outputted from the recording controller 102 is transmitted to the API section 121 in the scene change command controller 120 to be temporarily held in the command buffer 122. Number of commands which can be held in the command buffer 122 may be set in accordance with capacity of the stream buffer 104. For example, if the size of the stream buffer 104 is 20 Mbytes shown in the first embodiment, about 15 seconds of the encoded stream (i.e., 30 GOPs of data if 1 GOP is composed of 15 pictures, each of which has a time length of 0.5 seconds) can be temporarily stored in the stream buffer 104. Therefore, the command buffer 122 should be formed to be capable of holding 30 commands for extracting a scene change. If the command buffer 122 can hold 30 commands for extracting a scene change and 30 GOPs of data remains in the stream buffer 104, it is possible to extract a scene change in between the latest GOP and the GOP previous by 30 GOPs. In this case, it is also possible to extract a scene change in 30 GOPs, i.e., for 15 seconds. The scene change extraction result buffer 123 of the scene change command controller 120 can hold a plurality of results of the extracting of a scene change performed by the state controller 124 of the scene change extractor 110, and it is preferable to be configured so as to be capable of holding the results, number of which are the same as number of the commands that the command buffer 122 can hold.

As a result, even if the extracting processing of a scene change in the precedent GOP is not completed (e.g., a case where a user requests to reproduce the already recorded stream, the load of the system is increased, and the extracting processing of a scene change cannot be completed) and the encoding of the next GOP is completed, and a command for extracting a scene change is issued from the recording controller 102, a new command for extracting a scene change is held in the command buffer 122. Since the extracting processing of a scene change in the precedent GOP can be performed on the basis of the command for extracting a scene change held in the command buffer 122 after the extracting processing of a scene change being currently executed is completed, a problem that the next extracting processing of a scene change cannot be performed because the extracting processing of a scene change is not completed for each encoding of GOPs can be avoided.

Figure 4:
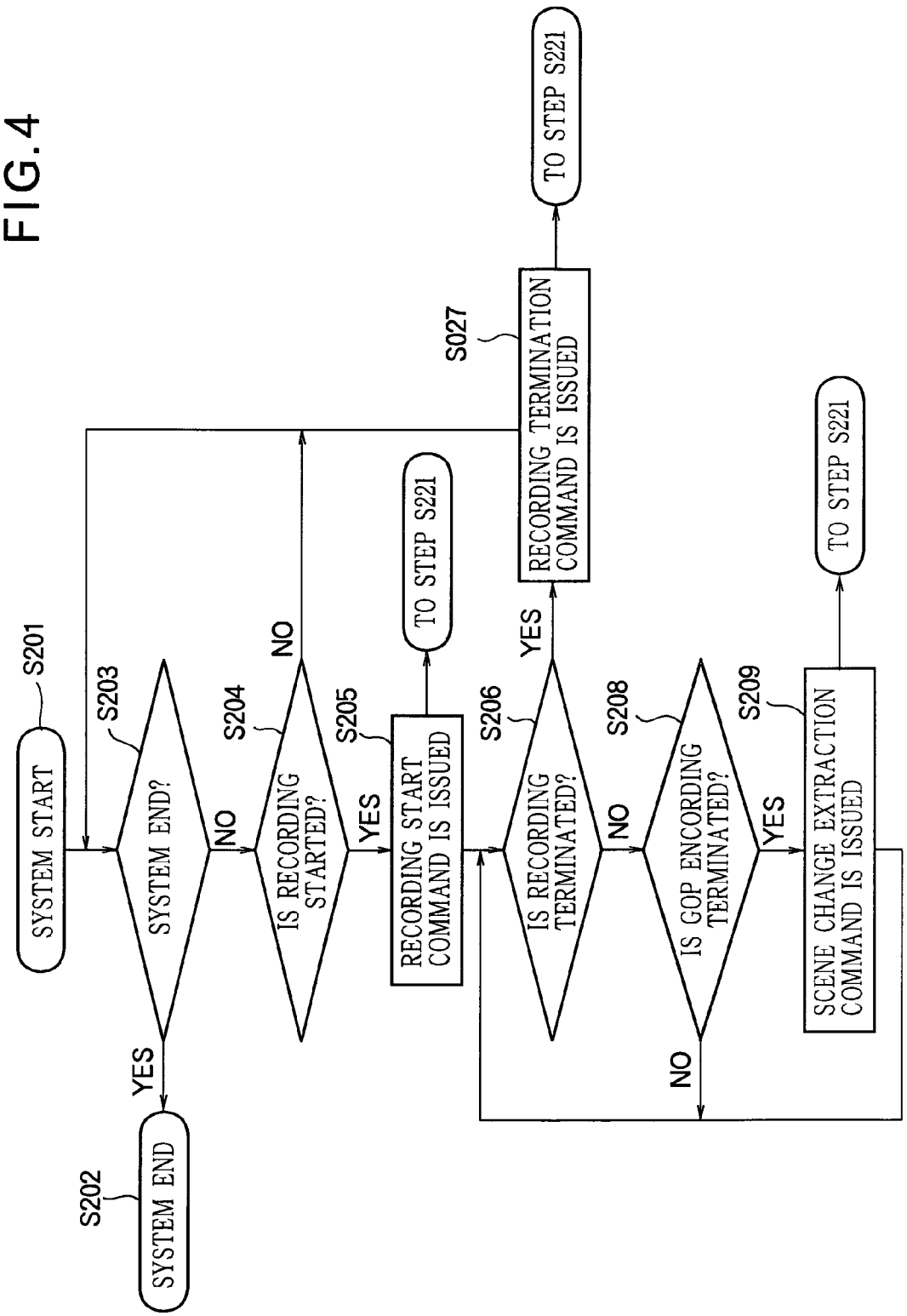
FIG. 4 is a flowchart showing the processing processes of the video recording apparatus according to the second embodiment.
Figure 5:
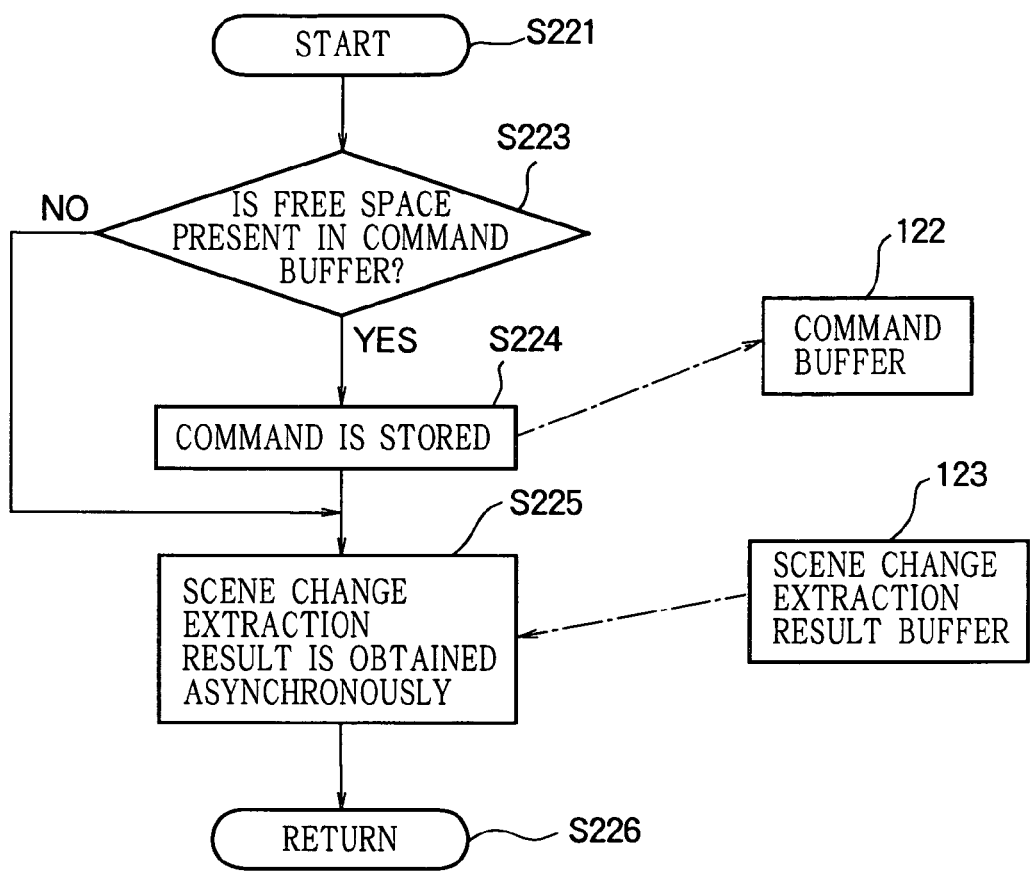
FIG. 5 is a flowchart showing the processing processes of an API section of a scene change command controller of the video recording apparatus according to the second embodiment.
Figure 6:
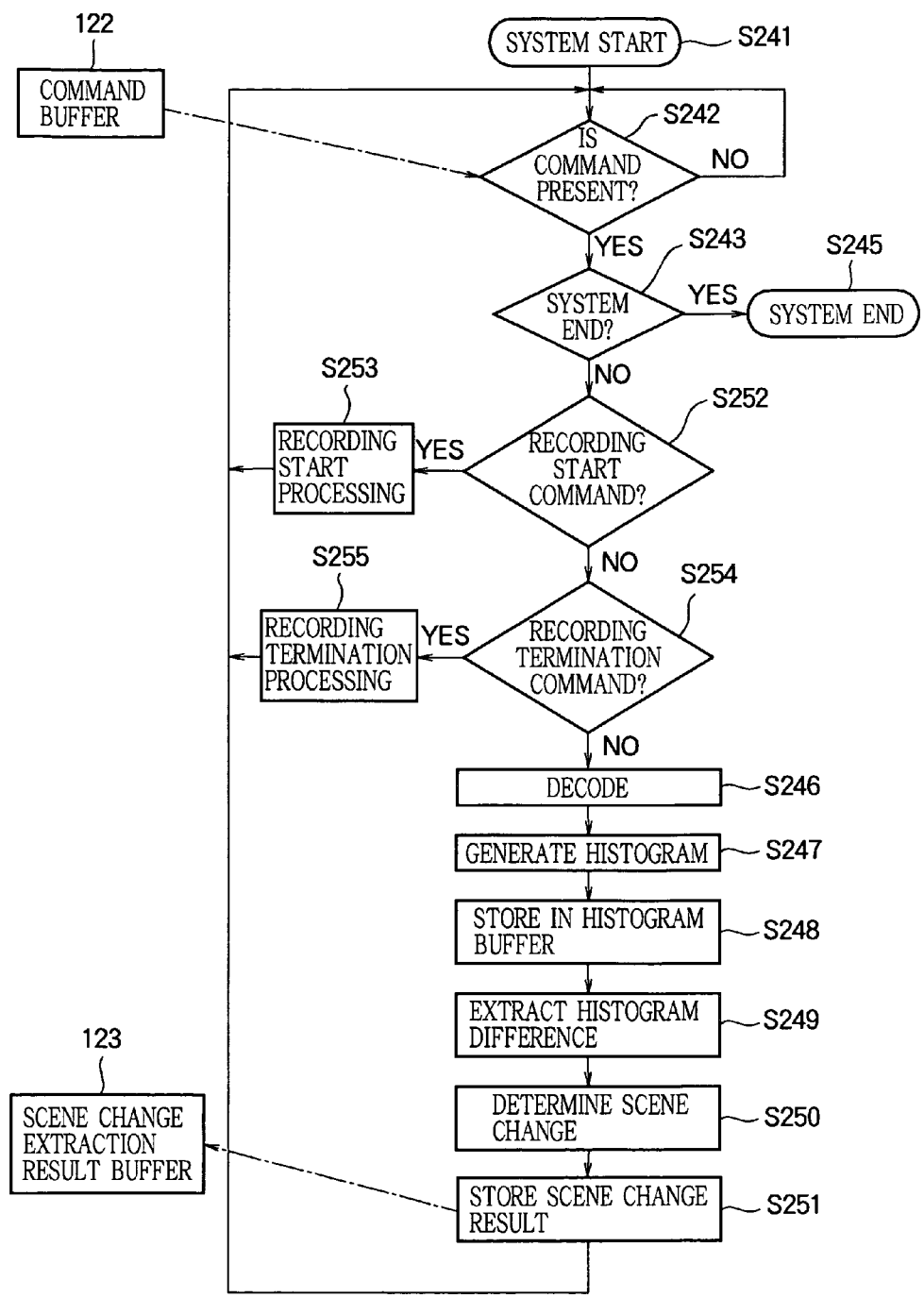
FIG. 6 is a flowchart showing the processing processes of a state controller of a scene change command controller of the video recording apparatus according to the second embodiment.

Next, the extracting processing of a scene change performed in asynchronism with the video recording operation will be described with reference to the flowcharts shown in FIG. 4, FIG. 5, and FIG. 6. First, operation of the recording controller 102 will be described. When the video recording apparatus 100 is powered on, the system starts up (step S201), confirms the system ending at regular intervals (step S202), and confirms the recording start (step S204), and if a system ending request is inputted, the system processing proceeds to the system ending (step S202). On the other hand, when the recording start is requested, a recording start command is issued to the scene change command controller 120 (step S205). After issuing the recording start command, the recording termination is confirmed (step S206), and if the recording termination is confirmed, the recording termination command is issued to the scene change command controller 120 (step S207). During video recording, the encoding of a unit-of-GOP is completed (step S208), a command for detecting a scene change is issued to the scene change command controller 120 (step S209). The GOP encoding detection (step S208) continues being performed until the video recording is completed. The control command issued from the recording controller 102 is processed by the API section 121 in the scene change command controller 120. When a command $C_{SC}$ for controlling a scene change is issued, whether a free space is present in the command buffer 122 is checked (step S223), and if the free space is present in the command buffer 122, the command is stored in the command buffer 122 (step S224). Regardless of whether the command is stored in the command buffer 122, next, the result of the extracting of a scene change stored in the scene change extraction result buffer 123 from the scene change state controller 124 is obtained (step S225). Finally, the result of the extracting of a scene change and whether the command is received are returned to the recording controller 102 (step S226).

On the other hand, after the power is turned on (step S241), the scene change state controller 124 is brought into the command wait state (step S242), and if the received command instructs system termination (step S243), the scene change state controller 124 is brought into the system end state (step S245). Further, if the command is a recording start command (step S252), the start processing of video recording (step S253) such as reservation of the memory or initialization of the variables for starting the video recording is performed, and if the command is a recording termination command (step S254), the termination processing of recording (step S255) such as cancellation of reservation of the memory or the sending of the result of the extracting of a scene change to the recording controller 102 is performed. On the other hand, if the received command is a command for extracting a scene change, the encoded stream is decoded (step S246) in accordance with a leading address in the stream buffer 104 of the encoded stream attached to the command for extracting a scene change. The histogram is generated from the video data of the YUV converted by the decoder 111 (step S247) and stored in the first histogram buffer 113 (or the second histogram buffer 114) (step S248). A difference value between the generated histogram and the histogram of the immediately previous picture stored in the second histogram buffer 114 (or the first histogram buffer 113) is calculated (step S249), and if it is not less than a previously established threshold value, the judgment that a scene change is present is made (step S250). This result is stored in the extraction result buffer 123 (step S251).

When the extracting processing of a scene change for one GOP is completed, processing proceeds to the command wait state for the next processing (step S242). If the command has already been stored in the command buffer 122, analyzing of the next GOP is started immediately, but if the next command has not been set yet, a command wait state is being kept (step S242).

In the video recording apparatus of the second embodiment, a priority of a task or thread of a software module performing the extracting of a scene change is lower than that of the module group performing video recording and reproducing. The reason is that the module for performing the extracting of a scene change must performs MPEG software encoding processing and therefore is very high load processing, thereby occupying a CPU, not shown, for performing software processing for a longer time than other modules. If the priority of the scene change extraction module is set to be equal or higher that a priority of the video recording reproducing module, most of the processing time of the CPU is occupied during video recording or reproducing. Therefore, the video recording processing by the module is delayed, and as a result it is possible that the recording or reproducing processing cannot be performed. Furthermore, processing of a module which operates in accordance with user's operation, for example, key operation, and processing of a module for displaying a screen image may be delayed similarly by the scene change extraction module. Accordingly, it is desirable that a priority of the scene change extraction module should be lower than a priority of the other modules. On the other hand, if analyzing of the scene change for GOPs successively generated by the video recording is not performed, the scene change detection cannot be performed. However, the encoding processing by the encoder 101 is performed in real time, but the generated encoded stream is temporarily held in the stream buffer 104 to be written in the HDD 105. Therefore, if the scene change module performs processing of the encoded stream in the stream buffer 104 when the encoded stream is held in the stream buffer 104, the extracting processing of a scene change for all GOPs can be performed.

A case where processing with a heavy system load such as a request for reproducing another program by the user or a display of the EPG program table is started up during the extracting processing of a scene change actually continuously being performed, for example, will be described below. The system is heavily loaded during the extracting of a scene change in the preceding GOP, and therefore the encoding completion notification of the next GOP is transmitted from the encoder 101 to the recording controller 102 when the processing of the preceding GOP does not progress enough.

The recording controller 102 immediately issues a command for extracting a scene change to the scene change command controller 120 of the scene change extractor 110. The API section of the scene change command controller 120 checks a free space in the command buffer (step S223), and if a free space is available, it causes the command for extracting a scene change to be stored in the command buffer. The scene change command controller 120 only stores the command for extracting a scene change, and immediately sends a return to the recording controller 102. Furthermore, unless the extracting of a scene change in the preceding GOP has been completed until a time when the encoding of the next GOP is completed, the API section causes the command for extracting a scene change after the next one to be stored in the command buffer. After that, when the extracting of a scene change has been completed, the scene change state controller is brought into a state of the command waiting (step S242), receives the oldest command from the command buffer, and start to perform the extracting of a scene change in the next GOP. After that, when the system load becomes steady, frequencies of occurrence of the extracting processing of a scene change increase, and processing based on the delayed command stored in the command buffer is performed successively. When the maximum permissible number of the delays is 20 GOPs and the requests of the scene change processing of more than 20 GOPs occur, the scene change processing of the target GOP is not performed because of no free space in the command buffer for the command. At this time, the recording controller 102 may perform any error processing, or may keep the recording processing without error processing because the video recording processing as a main purpose of the apparatus is under a normal condition.

By analyzing the stream temporarily held in the stream buffer 104 and buffering the command issued by the recording controller 102, the extracting of a scene change in the encoded stream is not always necessary every time the video is encoded, and can be delayed. Accordingly, the analyzing of a unit-of-analyzing in the scene change extractor 120 is not necessarily performed successively subsequent to the encoding processing of a unit-of-encoding in the recording controller 102, and therefore the system can be designed so that a unit-of processing in the encoding processing is independent of that of the extracting processing of a scene change.

Further, the recording controller 102 and the scene change extractor 120 can operate independently to each other. By setting a priority of processing of the scene change extractor 120 at a level lower than that of processing relating to the video recording, occurrence of the bad influence, in which the processing of the recording controller 102 is delayed due to the long processing time of the scene change extractor 120 and this influences to the normal video recording processing, can be avoided.

Furthermore, the extracting processing of a scene change is allowed to be delayed. Therefore, even if the extracting processing of a scene change has not completed within a reproduction period of a GOP due to the temporary increase of a system load or the extracting processing of a scene change is not selected as the processing to be performed, the extracting processing with respect to the stream that was encoded in the past can be successively performed using the command for extracting a scene change stored in the command buffer 122. Accordingly, occurrence of a problem that the extracting processing of a scene change is skipped and is not performed can be avoided.

Moreover, a permissible delay time and permissible number of times of the above-mentioned extracting processing of a scene change is determined on the basis of number of the stream buffer or buffers 104 and number of command buffer or buffers.

Further, except for the above-described points, the second embodiment is substantially the same as the first embodiment.

Third Embodiment

A video recording apparatus according to the third embodiment of the present invention is different from the video recording apparatus according to the first embodiment in a point that the third embodiment is configured by specifically identifying the structure of the decoder 111 of the video recording apparatus according to the first embodiment. Accordingly, FIG. 1 and FIG. 2 are also referred in the description of the third embodiment.

FIG. 7 is a block diagram showing a configuration of the decoder 111 of FIG. 1. The video recording apparatus according to the third embodiment is characterized in a method of controlling decode-order of the DCT (Discrete Cosine Transformation) coefficients. As shown in FIG. 7, the decoder 111 includes a pixel size detector 301 which calculates a pixel size from the header of the encoded stream; an order determination section 302 which determines components (order) used for the DCT block from the pixel size detected by the pixel size detector 301; a DCT coefficient extractor 303 which extracts a DCT coefficient while the inverse quantization of the encoded stream is performed until an order determined by the order determination section 302; an IDCT section 304 which performs inverse DCT from the extracted DCT coefficient; and an image shaping section 305 which generates a downsized picture by packing discrete pixel data generated using a deleted order by the inverse DCT.

Figure 8A:
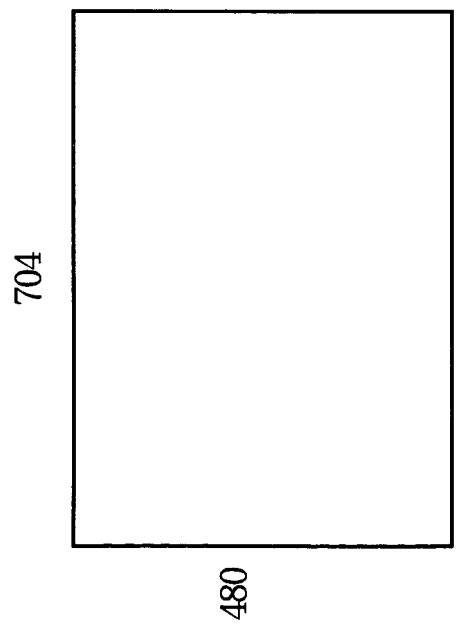
FIGS. 8A to 8D are diagrams describing the deleting processing of DCT coefficients in the video recording apparatus according to the third embodiment.
Figure 8B:
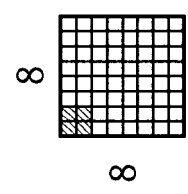
Figure 8C:
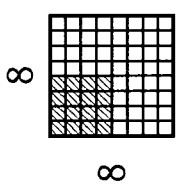
Figure 8D:
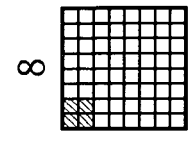

FIGS. 8A to 8D are diagrams describing reducing processing of DCT coefficients in the video recording apparatus according to the third embodiment. FIG. 8A shows pixel sizes of the encoded streams, FIG. 8B shows DCT blocks (a case where 2×2 are used) and DCT blocks (a case where 4×4 are used), FIG. 8C shows decoded DCT blocks (a case where part other than 2×2 are unavailable) and decoded DCT blocks (a case where part other than 4×4 are unavailable), and FIG. 8D shows decoded pictures. In the third embodiment, a video recording apparatus, in which the user can select a pixel size of the picture to be encoded from a pixel size of 704×480 pixels or a pixel size of 352×240 pixels, will be described. Therefore, the stream inputted to the decoder 111 is the encoded stream of 704×480 pixels or the encoded stream of 352×240 pixels. When the encoded stream is inputted to the decoder 111, first, the pixel size detector 301 detects a pixel size of the encoded stream to send the detected pixel size to the order determination section 302. The order determination section 302 determines an order De to be processed from among the DCT coefficients included in the encoded stream on the basis of the detected pixel size. For example, the system is set in advance so that in the case of the encoded stream of 704×480 pixels, processing until the order of 2 within the DCT block is performed, while in the case of the encoded stream of 352×240 pixels, processing until the order of 4 within the DCT block is performed. In accordance with the order that has mentioned above, the DCT coefficient extractor 303 and the IDCT section 304 set the order of the target of processing in the DCT block, and then perform decoding processing. In the decoded video data outputted from the IDCT section 304, since the DCT coefficients are thinned out on a unit-of-DCT-block basis, pixels of the decoded image generated by connecting the decoded DCT blocks form a discrete image. The image shaping section 305 performs processing for reducing intervals between pixels in an image, pixels of which are positioned separately from one another. By this processing, the decoded image becomes 176×120 pixels when the encoded stream is 704×480 pixels, and the decoded image becomes 176×120 pixels when the encoded stream is 352×240 pixels. Even if the inputted encoded streams are different in pixel sizes to each other, an image of the same size can be obtained. As described above, by sending the decoded image to the next histogram generator 112, the scene change detection can be performed in a similar manner to the first embodiment.

In other words, the third embodiment describes that even if the encoded streams are encoded to the different pixel sizes by the encoder 101, the images used for the extracting of a scene change can have the same pixel size and the upper limits of frequency bands of images to be analyzed in the extracting of a scene change can be made at uniform band by causing the decoder 111 to have a function of controlling the DCT coefficient. Further, in a histogram generator after the histogram generator 112, the extracting of a scene change can be always performed for the encoded stream of the same pixel size, processing after the next histogram generator 112 does not depend on the pixel size and the same processing can be performed.

According to the above structure, even if the pixel sizes of the encoded streams are different from one another, the decoded image of the same or approximately the same pixel size of the decoded image can be obtained.

Further, since the extracting processing of a scene change in the decoded image of the same pixel size can be performed even when the pixel sizes of the encoded streams are different, the same evaluation method and the same evaluation criterion for the scene change can be used for the streams each having a different pixel size of the encoded stream. As a result, even if the same video is recorded after changing the pixel size, the same position in time can be detected as a scene change.

Furthermore, since the frequency bands of the decoded image can be made uniform by controlling the DCT coefficients of the encoded streams each having a different pixel size, even if the same video is recorded after changing the pixel size, the same position in time can be detected as a scene change.

Moreover, since amount of the thinning of data can be increased as the resolution of the encoded data increases, the extracting of a scene change can be performed with high speed for the high resolution encoded data requiring a lot of processing time.

Further, the orders in the high frequency can be thinned out as the resolution of the encoded data increases. Therefore, as the resolution of the encoded data increases, thereby comparatively easily generating a high frequency noise, noise elimination can be realized efficiently.

Furthermore, since the same decoded image is generated regardless of the resolution, a size of the memory for storing the decoded video data may be the same size.

Moreover, since the high resolution video data, which normally requires a large memory size for storing the decoded video data, is thinned out to a higher extend, a memory region occupied for the decoding processing can be made small.

Further, except for the above-described respects, the third embodiment is substantially the same as the first or second embodiment.

Fourth Embodiment

A video recording apparatus according to the fourth embodiment of the present invention is different from the video recording apparatus according to the first embodiment in a point that the fourth embodiment is configured by specifying the configuration of the decoder 111 in the video recording apparatus. Accordingly, FIG. 1 and FIG. 2 are also referred in the description of the fourth embodiment.

Figure 9:
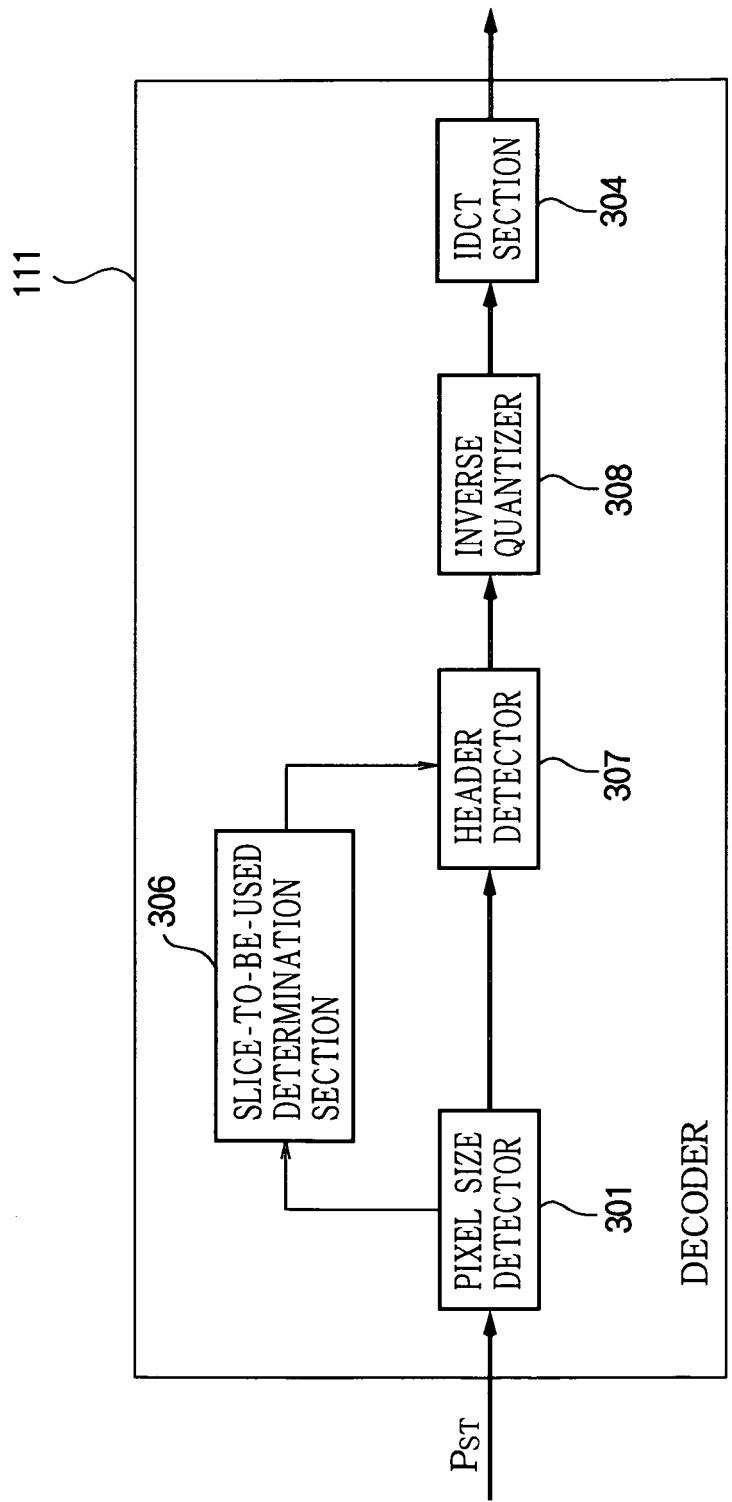
FIG. 9 is a block diagram showing a configuration of a decoder of a video recording apparatus according to the fourth embodiment of the present invention.

FIG. 9 is a block diagram showing a configuration of a decoder of the video recording apparatus according to the fourth embodiment of the present invention. The processing for defining a slice used for the decoding processing when the scene change is extracted from the encoded stream will be described with reference to FIG. 9. The decoder 111 of the video recording apparatus of the fourth embodiment includes a pixel size detector 301 which detects a pixel size from the header of the inputted encoded stream; a slice-to-be-used determination section 306 which determines a slice to be subjected to the extracting of a scene change from the pixel size detected by the pixel size detector 301; a header detector 307 which analyses the header of the encoded stream; an inverse quantizer 308 which inverse-quantizes the encoded stream; and an IDCT section 304 which performs the processing of inverse DCT of coefficients, which have been converted into a frequency domain.

Next, the slice reduction processing performed together with the extracting processing of a scene change will be described. The pixel size detector 301 detects a pixel size, and the slice-to-be-used determination section 306 determines a slice to be used. For example, resolutions of the encoded streams generated by the encoder belong to only any of two types of pixel sizes, 720×480 pixels and 352×240 pixels. When the number of pixels in a vertical direction is 480, 5 slices in an upper direction and 5 slices in a lower direction, that is, (16 pixels×5 slices)×2=80 pixels×2 are not used. On the other hand, when the number of pixels in a vertical direction is 240, 2 slices in an upper direction and 2 slices in a lower direction, that is, (16 pixels×2 slices)×2=32 pixels×2 are not used. The numbers of the useless pixels are different to each other on the basis of the resolutions, a ratio of the useless pixels in vertically arranged 480 pixels in a vertical direction is ⅓ because 10 slices are not used in all of 30 slices, and a ratio of the useless pixels in vertically arranged 240 pixels in a vertical direction is 4/15 because 4 slices are not used in all of 15 slices. Therefore, approximately the same ratio of pixels is subjected to the extracting of a scene change.

The slice-to-be-used determination section 306 obtains the number of slices to be used as has been described, the header detector 307 analyses the header of the encoded stream. If the header detector 30 extracts the slice header and determines a target slice as a useless slice that is not used by the slice-to-be-used determination section 306, it extracts the next slice header. On the other hand, if the header detector 30 extracts the slice header and determines a target slice as a slice to be used, it sends the slices to the inverse quantizer 308. The inverse quantizer 308 inverse quantizes the encoded stream, and the IDCT section 304 performs the inverse DCT. According to the above-mentioned structure, the decoding processing is performed only for the slices to be used, and as a result, 320 pixels of the vertical resolution can be obtained when the vertical resolution is 480 pixels. On the other hands, 172 pixels of the vertical resolution can be obtained when the vertical resolution is 240 pixels. With respect to the decoded image, which pixels are reduced in a vertical direction by the decoder 111, the histogram generator 112 generates a histogram of pixels placed at the same positions as those within the effective slice region and uses N (number of pixels within one frame), which represents number of pixels within a frame, to calculate a difference value 'd' by the difference extractor 115. In the fourth embodiment, since the pixels are reduced in a vertical direction, number of pixels N within a frame is changed as follows. If the original vertical resolution is 720 pixels, the vertical resolution after reduction of pixels is 320 pixels and the horizontal resolution is 720 pixels. As a result, $$N=320\times720=230400.$$

Further, the original vertical resolution is 240 pixels, the vertical resolution after reduction of pixels is 172 pixels and the horizontal resolution is 352 pixels. As a result, $$N=172\times352=60544.$$

By using the difference value 'd' obtained from the amended pixels, the scene change determination section 116 can determine the scene change in a similar manner to the first embodiment.

In the above description, whether the encoding is performed is determined for each of the slices, but a range used for detecting the scene change may be set on the basis of each of pixel positions or be set for a unit-of-macroblock. In this case, a position where the scene change is detected can be identified, a detection accuracy can be improved. Further, a method in which whether the extracting of a scene change is decided for each of pixels can be realized by decoding all pixels and calculating a histogram of a region to be extracted after the decoding and a difference value of the histograms. If a unit-of-detection is a macroblock, the header detector or the decoding processor can control whether or not the processing is performed in a unit-of-macroblock, unnecessary decoding is not performed, and therefore processing speed can be improved.

According to the above-described structure, the pixel size to be decoded and to be subjected to the extracting of a scene change can be reduced for every slice, and therefore processing speed can be improved.

Further, since the decoded picture size is reduced by reducing the slices, a memory size to be used can be reduced.

Furthermore, if the object of the detection of the scene change is a broadcast program, the extracting of a scene change can be performed by not using some slices placed at upper and lower positions, with avoiding influences of a time display, a textual information display of a special news bulletin, or a telop, that has little relation with a program main part of a program or is not very important information.

Moreover, by specifying the decoding and the extracting processing of a scene change on a macroblock basis, the scene change detection for only an arbitrary one or a plurality of macroblocks becomes possible. This makes it possible to perform the extracting of a scene change at the specified position.

Further, except for the above-described respects, the fourth embodiment is substantially the same as any of the first to third second embodiments.

Fifth Embodiment

A video recording apparatus according to the fifth embodiment is different from the video recording apparatus according to the first embodiment in a point of operation of the difference extractor 115. Accordingly, FIG. 1 and FIG. 2 are also referred in the description of the fifth embodiment.

Figure 10:
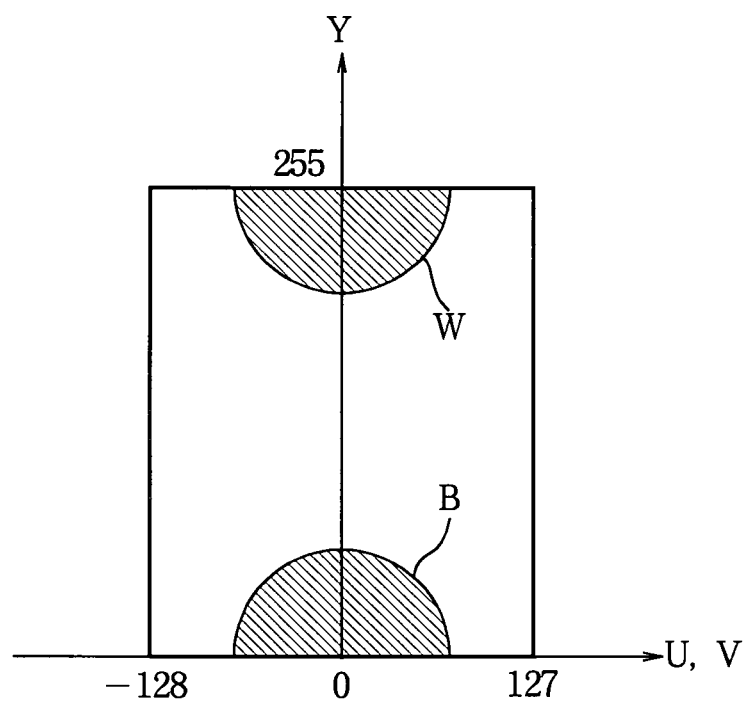
FIG. 10 is a diagram showing a YUV area in a video recording apparatus according to the fifth embodiment of the present invention.

In the fifth embodiment, a method of changing a determination criterion for the scene change will be described on the basis of a video as an object of the extracting of a scene change. FIG. 10 shows a YUV distribution of a pixel value of an image. In general, the YUV is expressed 256 values respectively, a luminance signal Y is a value from 0 to 255, and each of color-difference signals U and V is a value from −128 to 127. In FIG. 10, W is assigned to an area that a human feels approximately white, and B is assigned to an area that a human feels approximately black. The fifth embodiment describes a method, in which if a picture as a target of the extracting is a picture containing a high proportion of near-white region as a whole (hereinafter also referred to as a "white picture"), a difference value is calculated from a region other than a region W, and if a picture as a target of the extracting is a picture containing a high proportion of near-black region as a whole (hereinafter also referred to as a "black picture"), a difference value is calculated from a region other than a region B. The object of this method is to detect a scene change precisely even if two pictures to be compared bear a strong resemblance to each other.

Figure 11:
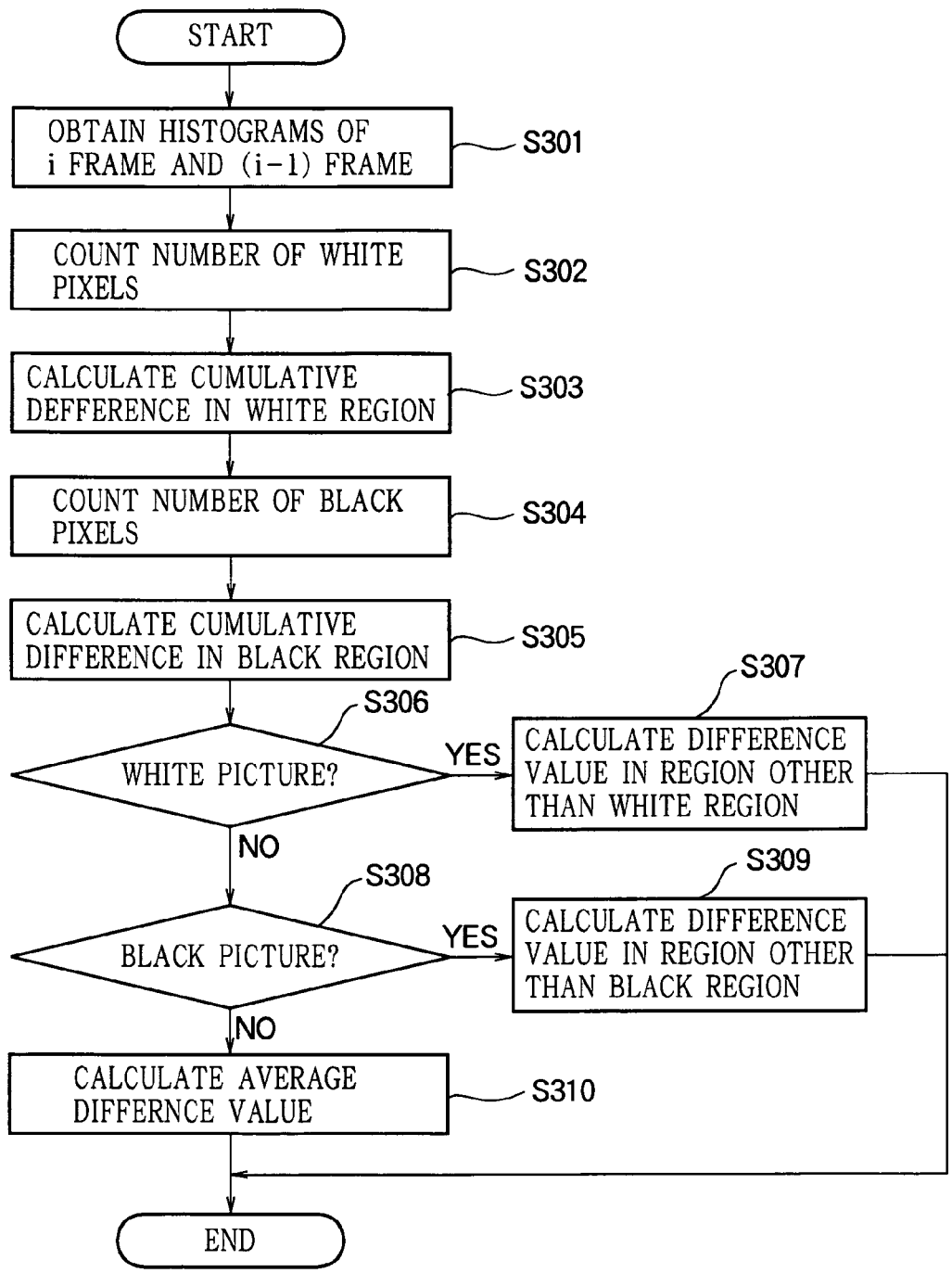
FIG. 11 is a flowchart showing the processing processes of a video recording apparatus according to the fifth embodiment.

FIG. 11 is a flowchart showing processing processes of the difference extractor 115 according to the fifth embodiment. First, histograms of the i-th frame (hereinafter referred to as "i frame") and the (i−1)-th frame (hereinafter also referred to as "(i−1) frame") are obtained from the first histogram buffer 113 and the second histogram buffer 114 (step S301). Next, the number of pixels of the white region W of each frame is counted (step S302). The number of the white pixels $C_{Wi}$ in the i frame and the number of the white pixels $C_{Wi-1}$ in the (i−1) frame are expressed by the following equations:

$$C_{Wi} = \sum^{k \in W} h_i(k)$$

$$C_{Wi-1} = \sum^{k \in W} h_{i-1}(k).$$

Next, the cumulative difference $r_w$ in the white region W is calculated by the following equation (step S303):

$$r_W = \sum^{k \in W} |h_i(k) - h_{i-1}(k)|.$$

On the other hand, with reference to the black region B, the numbers of the black pixels $C_{Bi}$ and $C_{Bi-1}$ are similarly calculated by the following equations (step S304):

$$C_{Bi} = \sum^{k \in B} h_i(k)$$

$$C_{Bi-1} = \sum^{k \in B} h_{i-1}(k).$$

Further, the cumulative difference $r_B$ of the black region B is calculated by the following equations (step S305):

$$r_B = \sum^{k \in B} |h_i(k) - h_{i-1}(k)|.$$

Next, if both the i frame and the (i−1) frame satisfy the following conditional equations, a target picture is judged as a picture containing a high proportion of near-white region (also referred to as a "white picture") (step S306), $$C_{W\_MAX} > C_{Wi} > C_{W\_MIN}, \text{ and}$$

$$C_{W\_MAX} > C_{Wi-1} > C_{W\_MIN}.$$

In these equations, the condition in which a target picture is judged as a picture containing a high proportion of near-white region is that the number of the pixels of the white region W is larger than the lower limit $C_W\_MIN$ and smaller than the upper limit $C_W\_MAX$. The reason why the upper limit is defined in addition to the condition that the number of the white pixels is larger than the lower limit is that if the number of white pixels is larger than a certain value, the number of pixels other than the near-white region is very small. In other words, the reason is that a scene change determination based on a very few pixels other than the white pixels with reference to the number of the pixels of the whole area should be avoided.

If the above conditions are satisfied, the difference value in a region other than the white region W is calculated by the following equation (step S307):

$$d = \frac{1}{N - C_{Wi} - C_{Wi-1}} \times \left\{ \left( \sum_{k=1}^{K} |h_i(k) - h_{i-1}(k)| \right) - r_W \right\}.$$

On the other hand, if a target picture is not judged as a picture containing a high proportion of near-white region, whether or not a target picture is a picture containing a high proportion of near-black region is judged by the following conditional equations (step S308).

$$C_B\_MAX > C_{Bi} > C_B\_MIN, \text{ and}$$

$$C_B\_MAX > C_{Bi-1} > C_B\_MIN.$$

In these equations, the condition in which a target picture is judged as a picture containing a high proportion of near-black region is that number of the pixels of the black region B is larger than the lower limit $C_B\_MIN$ and smaller than the upper limit $C_B\_MAX$. If the above conditions are satisfied, the difference value in a region other than the black region B is calculated by the following equation (step S309):

$$d = \frac{1}{N - C_{Bi} - C_{Bi-1}} \times \left\{ \left( \sum_{k=1}^{K} |h_i(k) - h_{i-1}(k)| \right) - r_B \right\}.$$

On the other hand, if a judgment is made that a target picture is not a picture containing a high proportion of near-white region and a judgment is made that a target picture is not a picture containing a high proportion of near-black region, the difference value is calculated by the following equation shown in the first embodiment (step S310):

$$d = \frac{1}{N} \times \sum_{k=1}^{K} |h_i(k) - h_{i-1}(k)|.$$

The scene change determination section 116 makes a judgment about the scene change using the difference value 'd' calculated by the above-mentioned procedure, in a similar manner to that shown in the first embodiment.

In the above-mentioned description, if both of two pictures to be compared are pictures each containing a high proportion of near-white region, the regions other than the near-white region in the two pictures are compared with each other to detect a change of picture, and if both of two pictures to be compared are pictures each containing a high proportion of near-black region, the regions other than the near-black region in the two pictures are compared with each other to detect a change of picture. Therefore, a scene change in a video from which a specific color region is eliminated can be extracted.

Accordingly, even if the scene is composed of consecutive pictures each containing a high proportion of near-white region or a high proportion of near-black region as a whole, the scene changes can be detected.

Specifically, in a joint between CMs (Commercial Messages) of a broadcast program when a displayed scene changes from a scene containing a company name or product name in a white background (or black background) to a scene containing a different company name or product name in a white background (or black background), a judgment is made using a region excluding a white background or black background. As a result, a scene change can be detected from a region of the company name or product name, and therefore a boundary of CMs can be detected very effectively.

Further, except for the above-described respects, the fifth embodiment is substantially the same as any of the first to fourth embodiments.

Sixth Embodiment

Figure 12:
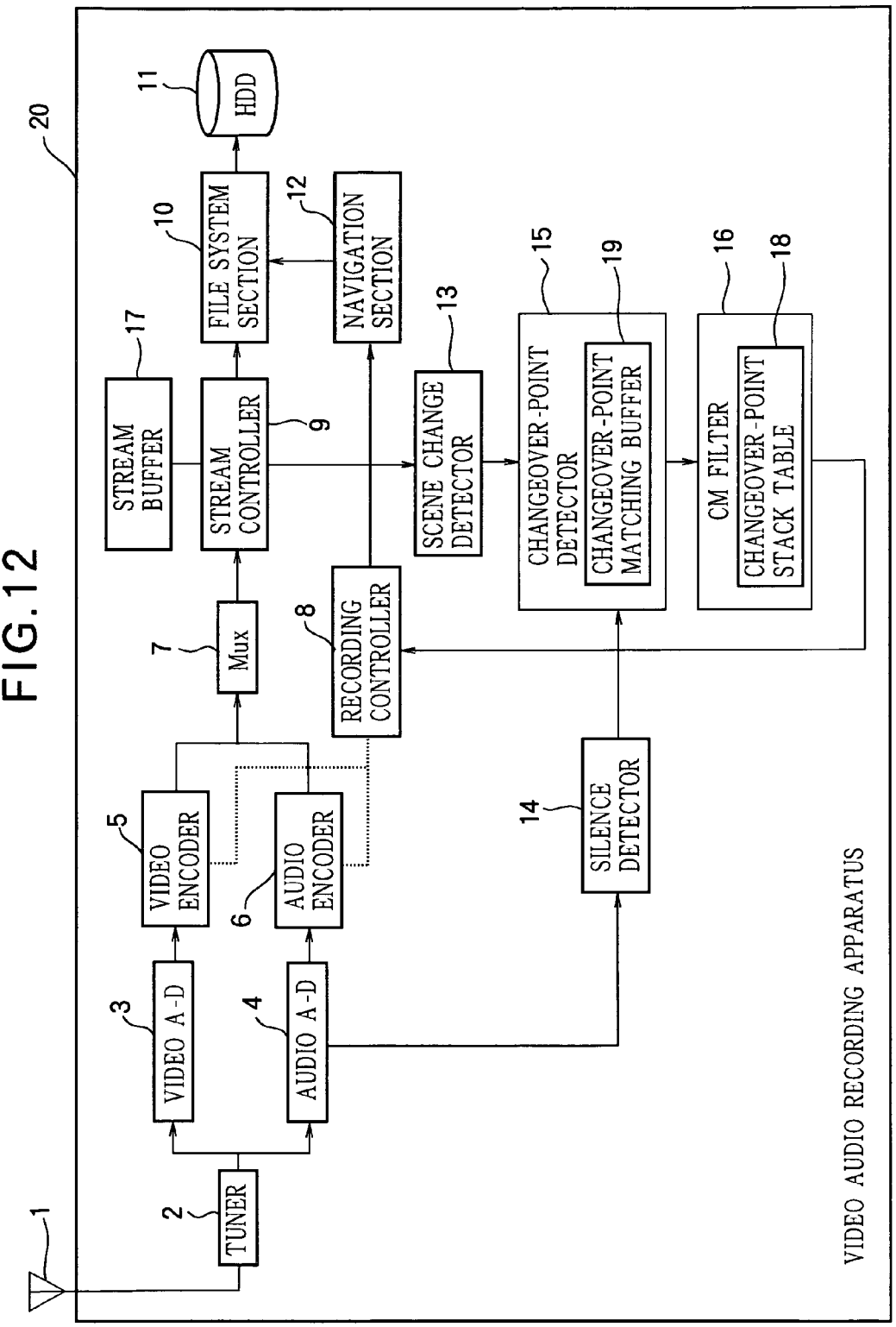
FIG. 12 is a block diagram schematically showing a configuration of a video audio recording apparatus according to the sixth embodiment of the present invention.

FIG. 12 is a block diagram schematically showing a configuration of a video audio recording apparatus 20 according to the sixth embodiment of the present invention. As shown in FIG. 12, the video audio recording apparatus 20 includes a tuner 2 which selects a channel to record a broadcast program from a broadcast wave received by an antenna 1; a video A-D converter 3 which converts an analog video signal outputted from the tuner 2 into a digital form; an audio A-D converter 4 which converts an analog audio signal outputted from the tuner 2 into a digital form; a video encoder 5 as an encode means which compress-encodes the digital video signal into an MPEG-2 (Moving Picture Experts Group-2) form; an audio encoder 6 as an encode means which encodes the digital audio signal into, for example, a linear PCM (Linear Pulse Code Modulation) form or a Dolby Digital form; a multiplexer (hereinafter referred to as "Mux") 7 which multiplexes the encoded video and audio signals to generate an encoded stream; and a recording controller 8 which controls the video encoder 5, the audio encoder 6, and the Mux 7.

Further, the video audio recording apparatus 20 includes a harddisk drive (HDD) 11 as a record means which records the encoded stream; a stream controller as a stream control means which writes the encoded stream multiplexed by the Mux 7 in the HDD 11 in a stable manner; a stream buffer 17 which temporarily stores the encoded stream; a file system section 10 which causes the HDD 11 to store each encoded stream generated as a file; and a navigation section 12 which generates and manages the address information used for realizing special reproduction and the CM period information in addition to a program name of the generated encoded stream and a creation date and time of the generated encoded stream.

Furthermore, the video audio recording apparatus 20 includes a scene change detector 13 as an image-change-point detection means which detects a scene transition in a video; a silence detector 14 as a silence detection means which detects a silence period in an audio; a changeover-point detector 15 as a changeover-point detection means which detects a changeover-point, in which a scene change and a silence period occurs simultaneously; a changeover-point matching buffer 19 as a temporary storage means which is disposed in the changeover-point detector 15 and holds information about the scene change and the silence period to detect a changeover-point; a CM filter 16 as a CM-broadcast-period determination means which detects a CM period from a plurality of changeover-points, periodicity as a specific characteristic of the CM, and the like; and a changeover-point stack table 18 which stores a changeover-point to be analyzed by the CM filter 16.

Although FIG. 12 shows the HDD 105 as the record means, other information recording media such as an optical disk, e.g., a DVD, and a magnetic tape may be used as the record means. Further, the video audio recording apparatus 20 may be a receiver set or a DVD/HDD hybrid recorder, which receives a broadcast program and records it. Furthermore, the video audio recording apparatus 20 can be applied for not only a video recorder for home use but also various devices such as a personal computer, a video server, and surveillance recorder of a surveillance system.

The file system section 10 manages data in order to convert the information to be written in the HDD 11 into a file form, thereby making it easy to access the written information. By virtue of the file system section 10, the stream controller 9 and the navigation section 12 can read and write data successively from a leading point of a file or a designated point of a file by specifying a file, without concern of a direct address in the HDD 11, when a stream or information is written in the HDD 11 or read from the HDD 11.

Since the MPEG-2 as an encoding scheme used in the video encoder 5 is adaptable to the variable rate, amount of the code generated for 1 second (bit rate) varies greatly with respect to time. Therefore, the stream controller 9 causes the stream buffer 17 to temporarily hold the encoded stream so as not to overflow or underflow the encoded stream by writing data in the HDD 11 or reading data from the HDD 11, thereby writing the encoded stream in the HDD 11 and reading the encoded stream from the HDD 11 in accordance with a state of the HDD 11. The stream buffer 17 includes a ring buffer, and an effective data area of the stream buffer 17 is managed by a write position pointer and a read position pointer. In other words, during time of data writing, data having a data size is written in an area, a leading position of which is indicated by the write position pointer, the write position pointer advances for a length corresponding to the size of the written data. On the other hand, during time of data reading, data having a data size is read from an area, a leading position of which is indicated by the read position pointer, the read position pointer advances for a length corresponding to the size of the read data. If any of the pointers reaches an end position of the ring buffer, the pointer returns to an initial leading position.

Next, the recording operation of the broadcast program will be described. When a user presses a video recording start button or a video recording start time set in advance by the video recording timer has come, the tuner 2 selects a designated channel from a broadcast wave received by the antenna 1. An analog video signal and an analog audio signal outputted from the tuner 2 is transmitted to a video A-D converter 3 and an audio A-D converter 4 respectively, and are converted to a digital video signal and a digital audio signal. In time of recording start, the recording controller 8 instructs a start of encoding to the video encoder 5 and the audio encoder 6 and instructs a start of multi-processing to the Mux 7. At this time, the digital video signal outputted from the video A-D converter 3 and the digital audio signal outputted from the audio A-D converter 4 are sequentially compress encoded in the video encoder 5 and the audio encoder 6, and multiplexed by the Mux 7 to generate a single program stream. After that, the stream controller 9 controls the program stream to be record in the HDD 11.

The video encoder 5 sends a GOP encoding-completion notification to the recording controller 8 every time the encoding of a GOP (Group of Pictures) as a unit-of-encoding is completed. The stream controller 9 sequentially writes the encoded stream encoded by the video encoder 5 and the audio encoder 6 and multiplexed by the Mux 7 in an area of the stream buffer 17, a leading point of which is indicated by a write position pointer. On the other hand, the stream controller 9 reads the encoded stream from a position in the stream buffer 17 indicated by a read position pointer to write it in the HDD 11, while confirming that the HDD 11 is in a writing state. During video recording, the above-mentioned operation is repeated. In time of the end of video recording, the recording controller 8 instructs the encoding stop to the video encoder 5 and the audio encoder 6 to stop encoding processing. After the encoding stop, the stream controller 9 writes the entire encoded stream left in the stream buffer 17 in the HDD 11.

Next, the scene change detection and the silence detection will be described. The recording controller 8 sends a command for detecting a scene change to the scene change detector 13 every time it receives a GOP encoding-completion notification from the video encoder 5. The scene change detector 13 reads the encoded GOP data from the stream controller 9 and detects a scene change in a video. An example of the detection method will be described below. First, an I-picture in the read data as a unit-of-GOP is decoded to generate a histogram. The histogram is compared with a histogram of an I-picture in the immediately previous read data, a sum of differences between respective element values of the histograms is defined as a scene change difference value. If the scene change difference value is greater than a previously established threshold value, it is judged that there is a scene change. In the following description, in order to make the description simple, a case will be described where number of pictures constituting a GOP is fixed at 15, and the 15 GOPs correspond to 0.5 seconds. Accordingly, a time when a scene change occurs can be easily expressed by the number of GOPs.

The audio A-D converter 4 converts the analog audio signal to a linear PCM signal as a digital audio signal. If a state where amplitude of the input linear PCM signal is not more than a previously established threshold value is kept for more than a previously established time, the silence detector 14 judges that there is a silence period. In this description, if a state where an amplitude of the input linear PCM signal is not more than a previously established threshold value is kept for more than 300 milliseconds, the silence detector 14 judges that a silence period occurs. The reason why the condition for a silence period includes that a state where an amplitude of the linear PCM signal is low is kept for more than a certain period of time, is that an instantaneous silence should not be judged as a silence period and if the below-described CM-broadcast-period is detected every time a silence occurs and a frequency of the below-described detecting processing of CM-broadcast-period increases, system processing load increases and there is a danger of becoming an obstacle to the processing other than the detecting processing of the CM broadcast period. If the judgment is made that a silence period occurs, a silence start time is calculated by a cumulative value of number of samples from the video recording start. Further, if amplitude of the linear PCM signal is larger than a previously established threshold value during a state of a silence period, it is judged that a silence period is finished and a silence end time is calculated from the cumulative value of the number of samples similarly.

Figure 13:
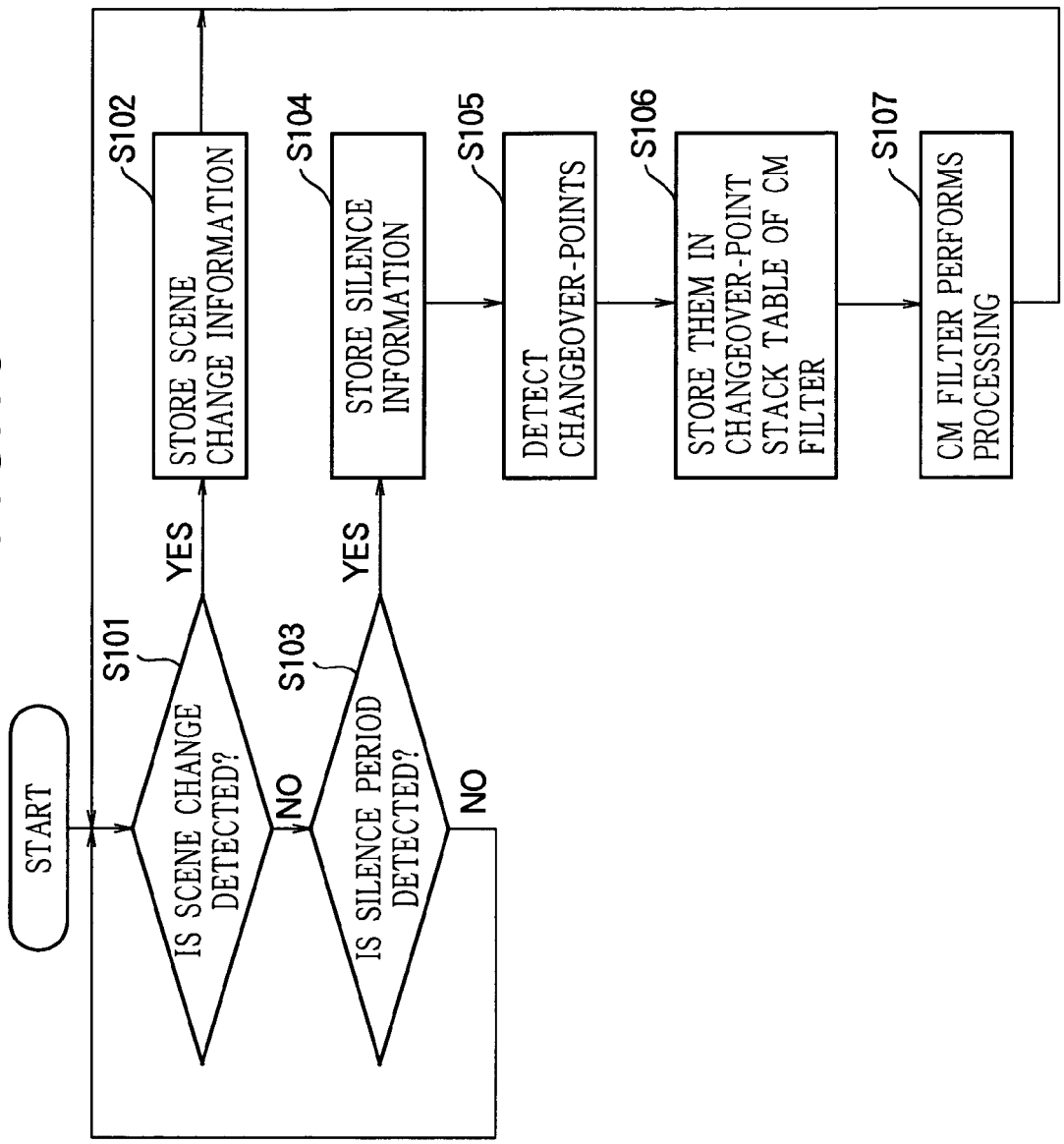
FIG. 13 is a flowchart showing the processing processes of a changeover-point detector of the video audio recording apparatus according to the sixth embodiment.

FIG. 13 is a flowchart showing processing processes of a changeover-point detector 15 of the video audio recording apparatus 20 shown in FIG. 12. The changeover-point detector 15 switches its processing on the basis of the scene change information supplied from the scene change detector 13 or the silence information supplied from the silence detector 14 For example, the changeover-point detector 15 starts to operate, the scene change detector 13 detects a scene change (step S101), and supplies scene change information such as a scene change detection flag, a GOP number, and a scene change difference value to the changeover-point detector 15. At this time, in step S101, the detected scene change information is stored in the changeover-point matching buffer 19 of the changeover-point detector 15 (step S102).

On the other hand, if the silence detector 14 detects a silence period (step S103), it supplies the silence period information such as a silence detection flag, a silence occurrence time, and a silence end time to the changeover-point detector 15. The silence information about a silence period determined in step S103 is stored in the changeover-point matching buffer 19 of the changeover-point detector 15 (step S104). When the silence period is detected, a changeover-point is detected in the changeover-point matching buffer 19, namely, a time position when a scene change and a silence occur at the same time is detected (step S105). The reason why a changeover-point detection is performed every time a silence period is detected, is that a higher processing efficiency can be obtained when a logical product of the scene change detection period and the silence period is calculated, every time a silence period is detected, occurrence frequencies of which is lower than the scene change detection. The changeover-point matching buffer 19 temporarily stores the latest information of the scene change and silence period. When both periods are coincident, the coincident information is sent to the next step S106, and the scene change information and silence period information as well as the previous scene change information and silence period information are deleted. Further, when a previously established constant time has been elapsed, the scene change information and silence period information are deleted. By virtue of such control, even if the buffer size is limited, the coincidence between the scene change and the silence period can be detected in real time. Therefore, the changeover-point can be detected on the basis of the GOP number of a scene change occurring between a start time and an end time of a silence period in the changeover-point matching buffer 19. Then, the GOP number of the scene change is used as a value indicating a time of a changeover-point. The detected changeover-point, a coincident scene change difference value, and a time length of a silence period are supplied to the next CM filter 16 (step S106), the CM filter 16 stores them in its changeover-point stack table 18 for storing a changeover-point and performs operation (step S107).

Next, a method of detecting a CM broadcast period by the CM filter 16 shown in FIG. 12 will be described. As shown in FIG. 12, a changeover-point stack table 18 for storing information about a changeover-point is provided in the CM filter 16. FIG. 14 is a diagram showing an example of the changeover-point stack table 18. The changeover-point stack table 18 is composed of a ring buffer, because it is updated during the detecting processing of CM broadcast periods in parallel with the video recording. Accordingly, a range from the read pointer before the write pointer is a processing range for detecting a CM broadcast period. The changeover-point stack table 18 contains a changeover-point GOP number indicating a time position of the changeover-point, a link-end GOP number indicating a time position of the last changeover-point when the subsequent changeover-point is judged as a CM, a changeover-point counter indicating number of subsequent changeover-points, a silence time length at the changeover-point, a scene change difference value at the changeover-point, and a valid/invalid flag indicating whether this changeover-point is valid or invalid.

A changeover-point GOP number is a GOP number, at which a scene change is detected. In the sixth embodiment, since a detection accuracy of the scene change is set as 1 GOP, time can be represented by cumulative number of the GOP number from video recording start.

The link-end GOP number is a GOP number of the last changeover-point in a CM broadcast period having a changeover-point as a start point. In FIG. 14, in the case of the changeover-point GOP number '10', the CMs are continuously detected during the GOP numbers '10', '40', and '101', and therefore the GOP number '101' becomes a link-end GOP number. When the changeover-point detector 15 detects a changeover-point 33g, the GOP number '130' is connected to the GOP number '101' and a judgment is made that a period from the changeover-point 33b to the changeover-point 33g is a CM broadcast period. Further, when there is no changeover-point subsequent to a changeover-point GOP number, the link-end GOP number becomes the same number as the changeover-point GOP number.

The changeover-point counter counts number of the changeover-points in the case where CMs are connected at a changeover-point during a CM broadcast period.

The silence time length indicates a length of a silence period in a changeover-point by milliseconds.

The scene change difference value indicates a change amount in a scene change in a changeover-point by a value from 0 to 1. This means that the larger the scene change difference value becomes, the larger the change amount of an image becomes.

The valid/invalid flag is a flag indicating that a changeover-point is within a range of an object to be processed in the changeover-point stack table. When the changeover-point is registered, a valid flag '1' is set. In the processing by the CM filter 16, for example, as shown in the changeover-point GOP number '40', the changeover-point is connected to the preceding changeover-point, and then the a flag is set to an invalid flag '0'. Further, when a changeover-point is not within a range of an object to be processed, for example, the GOP numbers '10', '40', '101', and '131' are detected as a CM period, the changeover-point GOP number '6' which is prior to '10' and the changeover-point GOP numbers '62' and '83' which are all changeover-point GOP numbers between '10' and '131' are set to an invalid '0', thereby increasing processing speed and reduce memory size required for the changeover-point stack table.

The CM filter 16 compares changeover-points as elements of the changeover-point stack table 18, and extracts the changeover-point, an interval of which is a previously established reference interval, for example, 15 seconds, 30 seconds, 60 seconds, or 90 seconds. At this time, because there is a probability that a length of a CM is deviated from 15 seconds due to a detection error, length variation in a frame level of the CM, and the like, a permissible margin is set, for example, to 1 GOP. Accordingly, a valid interval as an interval of the preceding changeover-point can be expressed by the number of the GOPs, and for example, by the number of the GOPs including a tolerance of ±1 GOP such as (30 GOPs±1 GOP), (60 GOPs±1 GOP), (120 GOPs±1 GOP), and (180 GOPs±1 GOP). The CM filter 16 determines an interval of a changeover-point coinciding with an interval of a GOP in which the above-mentioned changeover-point is previously established as a potential CM interval. Furthermore, when there are two consecutive potential CM intervals, its period is treated as a CM broadcast period.

Figure 15:
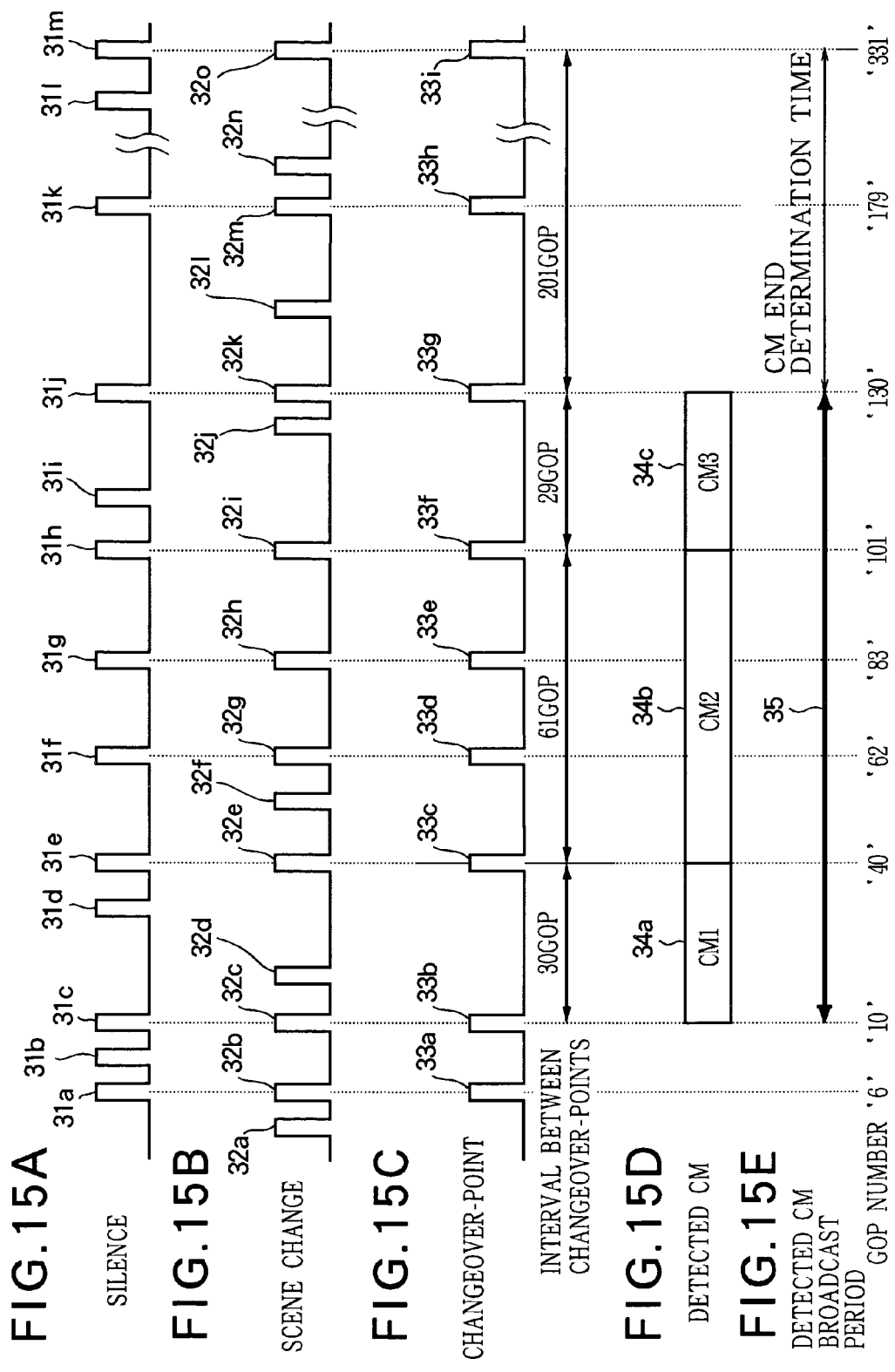
FIGS. 15A to 15E are diagrams describing the detecting processing of CM broadcast periods in the video audio recording apparatus according to the sixth embodiment.

FIGS. 15A to 15E are diagrams describing detecting processing of CM broadcast periods in the video audio recording apparatus 20 according to the sixth embodiment. A method of identifying a CM broadcast period will be described with reference to FIGS. 15A to 15E. The description will be made as to the case where the silence detector 14 detects silence periods 31a, ..., 31m. On the other hand, as shown in FIG. 15B, there are scene changes 32a, ..., 32o. Regarding the silence period, a silence occurrence time and a silence end time are obtained, and regarding the scene change, the GOP number when a scene change occurs is obtained. In the sixth embodiment, number of frames of a GOP is fixed so that a time is uniquely expressed by the GOP number. When time of a silence and time of a scene change are compared and the judgment is made that the silence and the scene change occur at the same time, this time point is detected as a changeover-point. Here, as shown in FIG. 15C, the changeover-points 33a, ..., 33i are detected. Furthermore, the above-mentioned CM interval coinciding with an interval between the changeover-points 33a, ..., 33i is judged as a CM. Here, an interval from the changeover-point 33b to the changeover-point 33c is 30 GOPs, an interval from the changeover-point 33c to the changeover-point 33f is 61 GOPs, an interval from the changeover-point 33f to the changeover-point 33g is 29 GOPs, and the respective intervals are detected as CMs. Further, since three CMs are succeeding, the changeover-points 33b, 33g are judged as the CM broadcast period. Furthermore, although a changeover-point 33i is detected in the time of 201 GOPs after the changeover-point 33g, since an interval from the changeover-point 33g to the changeover-point 33i exceeds a previously established maximum value of the CM broadcast period, i.e., 180 GOPs, a judgment is made that the CM is finished. This indicates completion of the CM broadcast period.

Next, a CM detection processing by the CM filter 16 will be described with reference to FIG. 16. When the changeover-point detector 15 detects a changeover-point at which both a scene change and a silence period occur at the same time, its information is supplied to the CM filter 16 and then the CM filter 16 starts to operate (step S401). The information of the detected changeover-point is stored in the rearmost space of the changeover-point stack table 18 in the CM filter 16 (step S402). The information stored in the changeover-point stack table 18 of the CM filter 16 includes a valid/invalid flag; a changeover-point GOP number; a link-end GOP number; a changeover-point counter value indicating number of the changeover-points detected as the consecutive CMs; a silence time length of the detected changeover-point; and a scene change difference value indicating a change amount of a scene change. Next, a start point to be read from the changeover-point stack table 18 is set (step S403). In FIG. 15C, for example, if processing until the changeover-point 33a has been completed at the last time, the next changeover-point 33b is regarded as the first start point at this time. Next, an end point side of the changeover-point is set (step S407). In FIG. 15C, the changeover-point 33c is set as an end point. If there is no changeover-point as an end point in the changeover-point stack table 18 (step S408), the next start point is obtained (step S404). In FIG. 15C, when a start point is the changeover-point 33a and an end point is the changeover-point 33i, processing is made so as to make the changeover-point 33b as a start point. Here, if no start point is found (step S404), the CM detection processing is finished (step S406). If the start point and the end point are determined, a time length from the start point to the end point is calculated (step S409). In FIG. 15C, if the start point is the changeover-point 33b and the end point is the changeover-point 33c, a difference between the start point '10' and the end point '40' (i.e., an interval between the changeover-points), 30 GOPs, is the time length. If the time length coincides with any of the CM reference time, (30 GOPs±1 GOP), (60 GOPs±1 GOP), (120 GOPs±1 GOP), and (180 GOPs±1 GOP) (step S410), the link-end GOP number at a start point is replaced with the link-end GOP number of the end point (step S411). Furthermore, a valid/invalid flag of the end point is set to invalid (step S412), and a changeover-point count of the start point is incremented by one (step S413). Further, in step S410, if a judgment is made that the difference is not the CM reference time length, a judgment is made whether or not a time length between the next start point and the end point exceeds the maximum CM reference time length, (180 GOPs±1 GOP) (step S414). If a judgment is made that it exceeds, a period from the start point to the link-end GOP number is judged as a CM broadcast period, and information of the CM broadcast period is supplied to the recording controller 8 (step S415). Furthermore, a start point of the next detection processing of a CM broadcast period is set as a changeover-point next to the final changeover-point in the current CM broadcast period. A valid/invalid flag of a changeover-point before the detected final changeover-point is set to an invalid flag (step S416).

The above-mentioned steps are successively performed during video recording, and therefore the CM broadcast periods of the broadcast programs to be recorded are detected in real time. The time information of the CM broadcast period detected by the CM filter 16 is supplied to the recording controller 8 temporarily, transmitted to the navigation section 12 for treating management information of the recorded program, converted into a file format by the file system 10, and recorded in the HDD 11 as a CM-broadcast-period-information record means.

Since the video audio recording apparatus 20 is constructed as mentioned above, a CM broadcast period can be detected in parallel with the recording of the broadcast program.

Further, in general, if an encoder without a scene change detection function is adopted, analyzing of the recorded program after video recording is needed. However, since the CM broadcast period can be detected in parallel with video recording in the present invention, a range of choice of the encoder is extended and an encoder can be selected with emphasis on cost and easy availability.

Furthermore, by supplying the stream from the stream controller 9 to the scene change detector 13 and the silence detector 14, a CM broadcast period for the programs recorded in the HDD 11 can be detected. In this case, silence detection also must be analyzed for the stream in a similar manner to the scene change detection.

Moreover, since the scene change detection result and the silence detection result are temporarily stored in the changeover-point matching buffer 19 as a temporary recording area, and are compared with each other in the recording area of the changeover-point matching buffer 19, the changeover-point can be detected in real time. Accordingly, the CM broadcast period can be detected in parallel with the video recording. Further, even if both information of the scene change and the silence period occurring at the same time are notified to the changeover-point detector 15 with a certain time difference, since the both information is held in the changeover-point matching buffer 19, a case where one item of information is lost can be avoided and a CM broadcast period can be detected.

Further, a construction for performing the detection processing of the CM broadcast period is adopted so that when the scene change is detected, the information is recorded only in the changeover-point matching buffer 19 as a temporary recording area, and when a silence is also detected, not only the information is recorded in the changeover-point matching buffer 19 but also a scene change occurring at the same time as the silence is detected in the changeover-point matching buffer 19. Therefore, processing can be performed in synchronism with a silence detection having less number of detections. Accordingly, the detection of the CM broadcast period can be performed with short processing time of the CPU and light system load.

Furthermore, since a unit-of-detection of a CM broadcast period is not a unit-of-frame, but is, for example, a unit-of-GOP, not only processing frequencies and processing load can be reduced, but also even if lengths of CMs are different for CMs by several frames, a CM broadcast period can be detected without an influence of a difference of the CM length.

Moreover, in the above description, a case where a unit of scene change detection is 1 GOP has been described, a unit of scene change detection can be set to a plurality of unit-of-GOPs. Further, a unit of scene change detection may be an arbitrary number of frames.

In addition, in the above description, a case where the scene change and the silence detection processing are performed by software has been described, these may be performed by hardware. Further, a case where the audio analyzing is performed by directly analyzing an output of the audio A-D converter 4 has been described, a silence may be detected by analyzing the encoded stream.

Seventh Embodiment

In the seventh embodiment, a method of selecting a changeover-point regarded as a boundary between CMs when there is a plurality of changeover-points around a boundary between CMs will be described. In general, an on-screen title such as a name of company which puts an advertisement or a product name is often displayed temporarily at a beginning and/or ending of a CM. For this reason, in the vicinity of a boundary between CMs, a silence and a scene change take place at the same time, and therefore a plurality of changeover-points often takes place successively. On the other hand, when detecting a CM broadcast period, in order to make up for an error of a time length of a CM, a delay of detection of a CM, and variation of detection of a CM, a certain amount of margin of a reference CM length is allowed for detecting a CM. For example, in the sixth embodiment, when a CM of 15 seconds is detected, detection is made using a reference of a range within (30±1 GOPs). However, since a plurality of changeover-points takes place within a detection width of ±1 GOP in some cases, a rule for selecting one changeover-point from the potential changeover-points is needed. Therefore, in the seventh embodiment, three selection criteria are describes as a rule for selecting one changeover-point from the potential changeover-points.

Figure 17A:
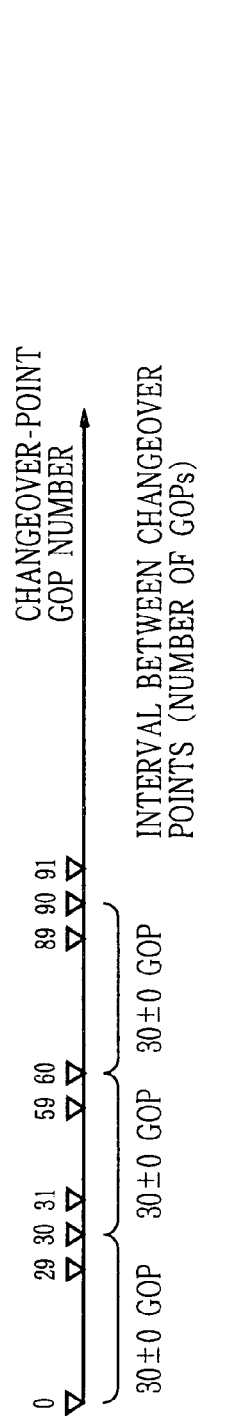
FIGS. 17A to 17C are diagrams showing a changeover-point detection method in a video audio recording apparatus according to the seventh embodiment of the present invention.
Figure 17B:
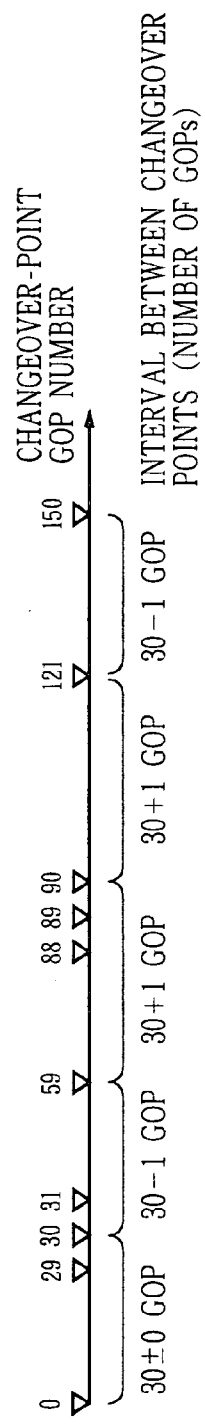
Figure 17C:
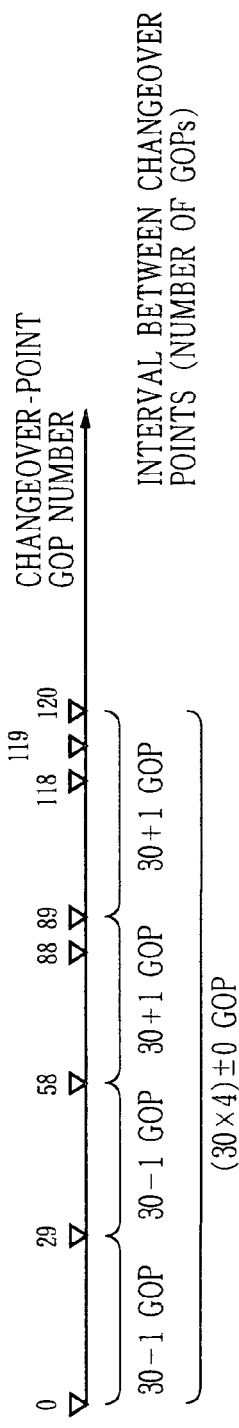

FIGS. 17A to 17C show the potential changeover-points and the selected changeover-points. The first method is a method in which a next changeover-point is selected in such a way that an interval between changeover-points is a reference period of time with a margin of ±0 GOP such as 30 GOPs, 60 GOPs, and 90 GOPs as shown in FIG. 17A.

The second method is a method in which, when an interval between the selected changeover-points is 29 GOPs (=30 GOPs−1 GOP) in the detection of a certain CM boundary as shown by the GOP number '30' to the GOP number '59' in FIG. 17B, the next CM boundary is detected in such a way that an interval between the selected changeover-points becomes 31 GOPs (=30 GOPs+1 GOP) or within a range, a center of which is 31 GOPs as shown by the GOP number '60' to the GOP number '90' in FIG. 17B. This is a method in which, when the selected changeover-point is temporarily deviated from a reference value (corresponding to the GOP number '59' in FIG. 17B), the next changeover-point is preferentially selected from a GOP which cancels out the deviation (corresponding to the GOP number '90' in FIG. 17B). In other words, when a plurality of changeover-points, in which the detected scene change and the detected silence period take place at the same time, is detected within a previously established time range (within a range of ±1 GOP), a center of which is a previously established reference period of time (e.g., 30 GOPs), the CM filter 16 judges a changeover-point, which has the largest degree for bringing a total of a CM time length detected in the immediately previous detection and a CM time length to be detected in the next detection close to an integer multiple of the previously established reference period of time (e.g., 30 GOPs), as a changeover-point for defining a CM broadcast period.

The third method is a method in which a changeover-point is selected in such a way that a cumulative time becomes within a range of ±0 GOP if possible. In this method, as shown in FIG. 17C, after the GOP numbers '0', '29', and '58' are selected as the selected changeover-points, the GOP number '88' which makes a GOP interval (30 GOPs±0 GOP) is not selected, but the GOP number '89' which makes a GOP interval (30 GOPs+1 GOP) is selected, while at the next detection, the GOP number which makes a GOP interval (30 GOPs−1 GOP) and the GOP number which makes a GOP interval (30 GOPs±0 GOP) are not selected, but the GOP number '120' is selected in order to make a deviation of the changeover-point as a whole within ±0 GOPs. In other words, when a plurality of changeover-points, in which a scene change and a silence period are detected at the same time, exist within a previously established range (a range of +1 GOP) including as a center a previously established reference period of time (e.g., 30 GOPs), the CM filter 16 judges a changeover-point, which causes a CM broadcast period to be judged to approach closestly an integral multiple of the reference period of time (e.g., 30 GOPs), as a changeover-point for defining a CM broadcast period.

By adopting the above-mentioned second method or third method, even if the changeover-point is temporarily deviated from a position of a boundary between CMs due to the detection error or the like, the correction processing is possible, and as a result, a CM broadcast period detection accuracy can be improved.

Further, by preferentially selecting a changeover-point whose deviation as a whole is a range of ±0 GOP, the detected CM broadcast period approaches to the reference period of time, and the detection accuracy of the CM broadcast period can be improved.

Furthermore, weights may be assigned to the detected changeover-points so as to make a deviation of a reference period of time of the cumulative time value or the cumulative value of GOP numbers from the reference period of time is within a range ±0 GOP. This can reduce an occurrence frequency of problems that an error, ±1 GOP that may occur in detecting of one CM is accumulated during consecutive CM broadcast periods, the detected changeover-point is deviated from a proper CM boundary, and a CM to be detected cannot be detected due to the deviation from the proper CM boundary.

Further, except for the above-described respects, the seventh embodiment is substantially the same as any of the first to sixth embodiments.

Eighth Embodiment

The eighth embodiment describes a method of improving detection accuracy of a CM broadcast period by using a silence time length in a changeover-point.

In general, in a television broadcast program, there are silence portions of about 0.5 seconds before and after a CM, and there is a silence portion of about 1 second (≈0.5 seconds×2) which is a sum of both silence portions of the CMs at a boundary as a joint between CMs. On the other hand, when a program main part is switched to a CM or when a CM is switched to a program main part, since a silence portion on the side of a program main part is often short, a sum of both silence portions of the CMs is sometimes a silence portion of about 0.6 seconds.

Figure 18:
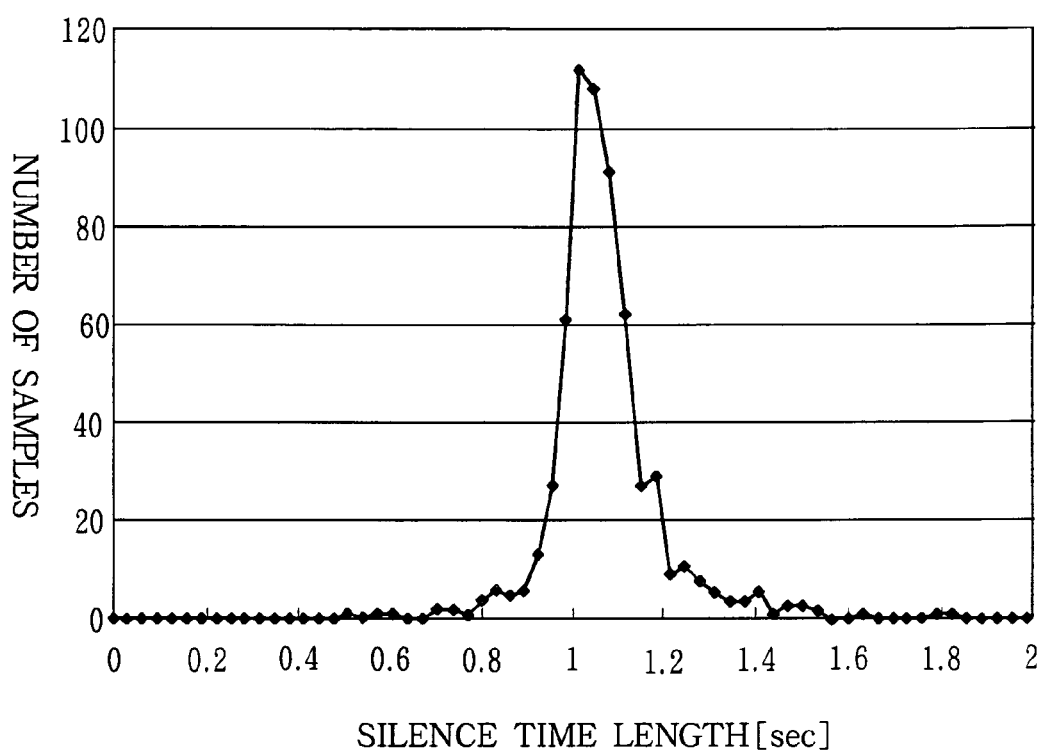
FIG. 18 is a graph showing a measurement result of silence time lengths between CMs in a video audio recording apparatus according to the eighth embodiment of the present invention.

FIG. 18 is a graph showing a result of measurement of a time length of a silence portion between a CM and the next CM in a broadcast period including the actual broadcasted arbitrary 20 programs and 591 CMs. As shown in FIG. 18, almost all of the silence portions between CMs have a time length ranging between 0.8 seconds and 1.4 seconds.

Figure 19:
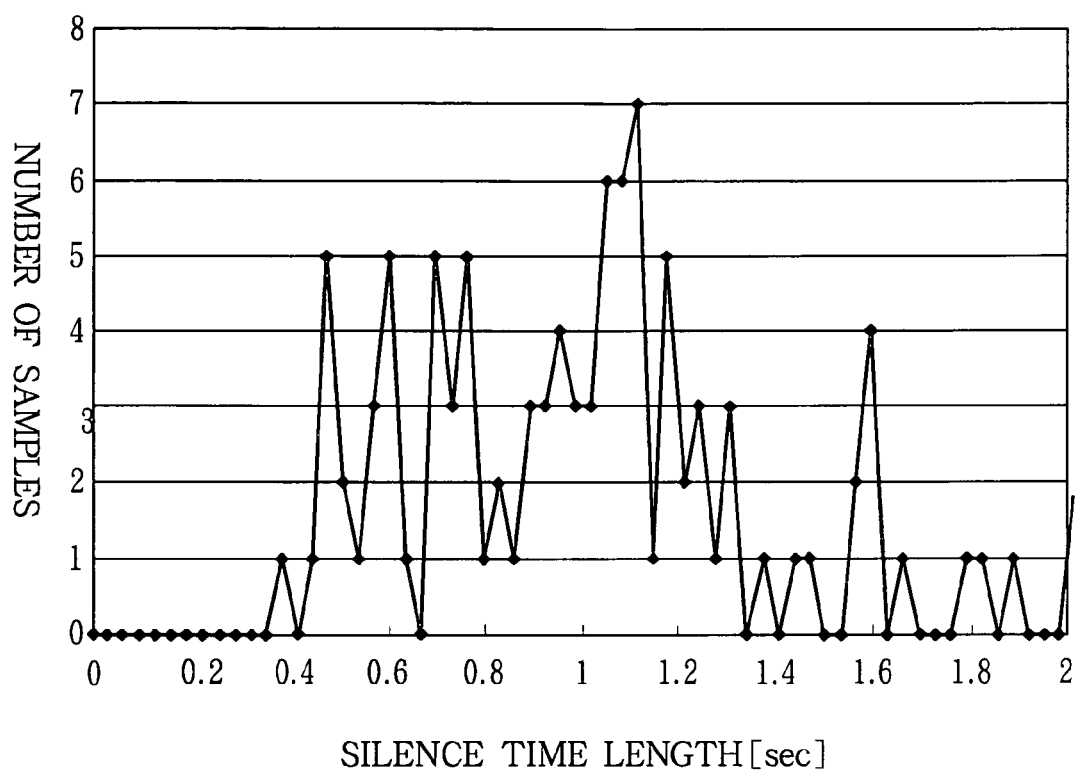
FIG. 19 is a graph showing a measurement result of silence time lengths in time of a change from a CM to a program main part in the video audio recording apparatus according to the eighth embodiment.

FIG. 19 is a graph showing a result of measurement of a time length of a silence portion when the CM broadcast period ends and a program main part starts in a program period including arbitrary 20 programs in the same manner as in FIG. 18. As shown in FIG. 19, it can be understood that in time of the change from the CM broadcast period to the program main part, almost time lengths of the silence portions are within a range between about 0.4 seconds and about 1.2 seconds. In other words, if the silence time length in the changeover-point shown in the sixth embodiment is within a range from 0.4 seconds to 0.8 seconds, or, is equal to or more than 1.4 seconds, in most cases, a judgment can be made that the CMs are finished and a change from the CM to the program main part is completed.

Figure 20:
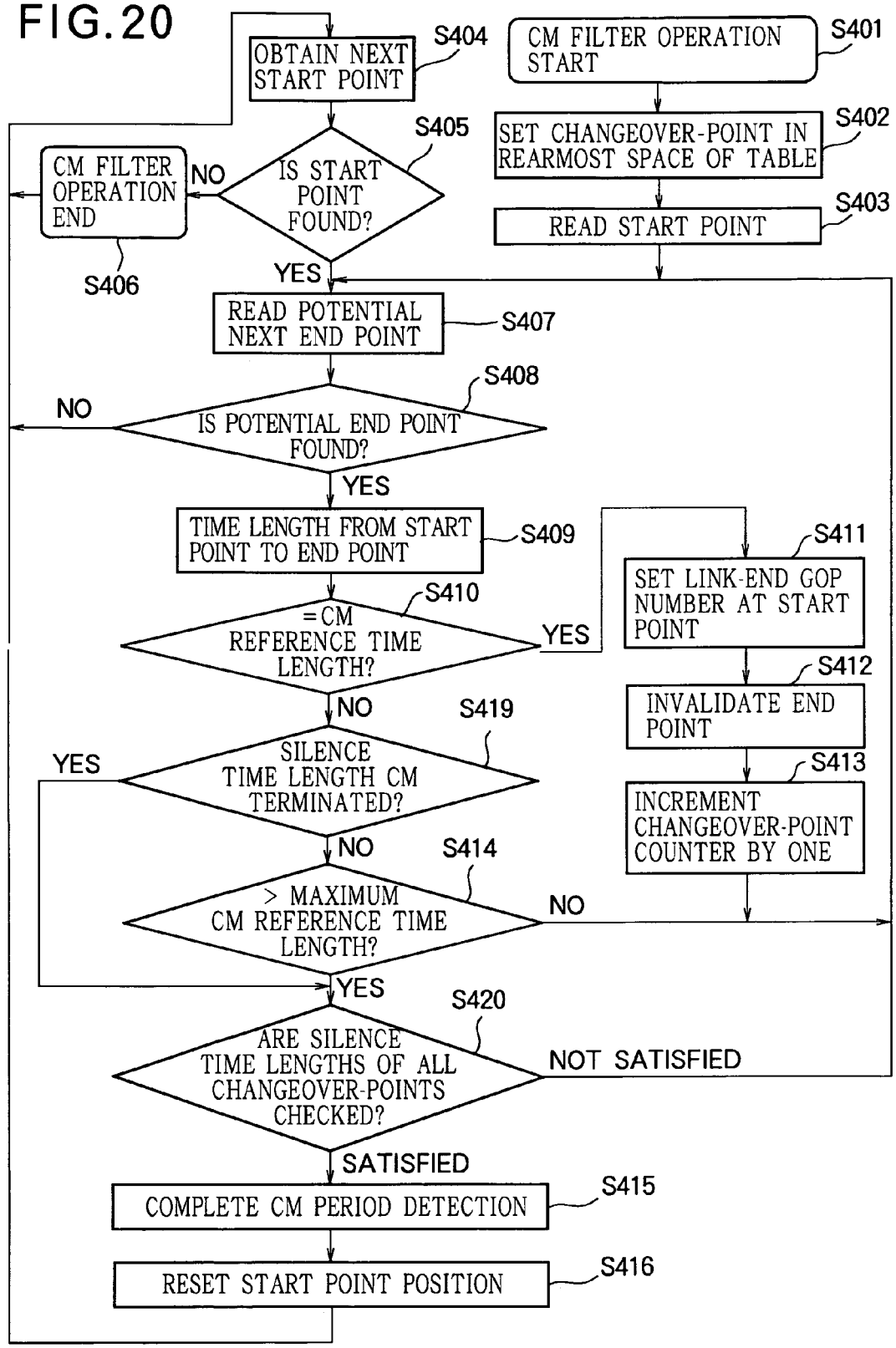
FIG. 20 is a flowchart showing the detecting processing processes of CM broadcast periods using the silence time lengths in the video audio recording apparatus according to the eighth embodiment.

FIG. 20 is a flowchart showing a method of detecting a CM broadcast period using a silence time length between CMs. In FIG. 20, steps which are the same as the steps shown in FIG. 16 are assigned the same number or symbol. A detection method in the eighth embodiment is basically the same as that of the sixth embodiment. However, the detection method in the eighth embodiment includes a step of testing a silence time length of the changeover-point in step S420, and when at least two CMs are detected, as has been described, a step of judging that the CM ends if the silence time length is not within a range from 0.8 seconds to 1.4 seconds (i.e., a first prescribed range). Further, the detection method in the eighth embodiment includes a step of testing whether or not there is at least one silence portion, a silence time length of which the changeover-point is a range from 0.8 seconds to 1.4 seconds (step S420), and when at least one CM is detected, a step of judging that the period is not adopted as a CM broadcast period if the silence time length is not within a range from 0.8 seconds to 1.4 seconds.

Since adopting the above construction, an end position of the CM broadcast period and a start position of the program main part can be detected, the detection accuracy of the CM broadcast period can be improved.

In particular, when both a scene change and a silence occur when it takes the same time as the CM interval after a CM is changed to a program main part, a beginning part of the program main part may be erroneously detected as a CM. However, the CM end position can be detected with high accuracy by using a silence time length, and therefore occurrence frequency that a beginning part of the program main part is false detected is reduced. As a result, the detection accuracy of the CM broadcast period will be improved.

Furthermore, when both a scene change and a silence period occur at the same time at a plurality of times in the program main part, and their interval is the same as the interval of generation of both a scene change and a silence period in the CM broadcast period, the program main part is sometimes false detected as a CM broadcast period. However, since the condition that the silence time length coincides with a silence time length between CMs is needed, occurrence frequency of the false detection of the program main part as a CM can be reduced.

Moreover, except for the above-described respects, the eighth embodiment is substantially the same as any of the first to seventh embodiments.

Ninth Embodiment

In the ninth embodiment, a method of detecting a CM broadcast period that can improve detection accuracy by using a scene change difference value indicating a change amount in a scene change will be described.

Figure 21:
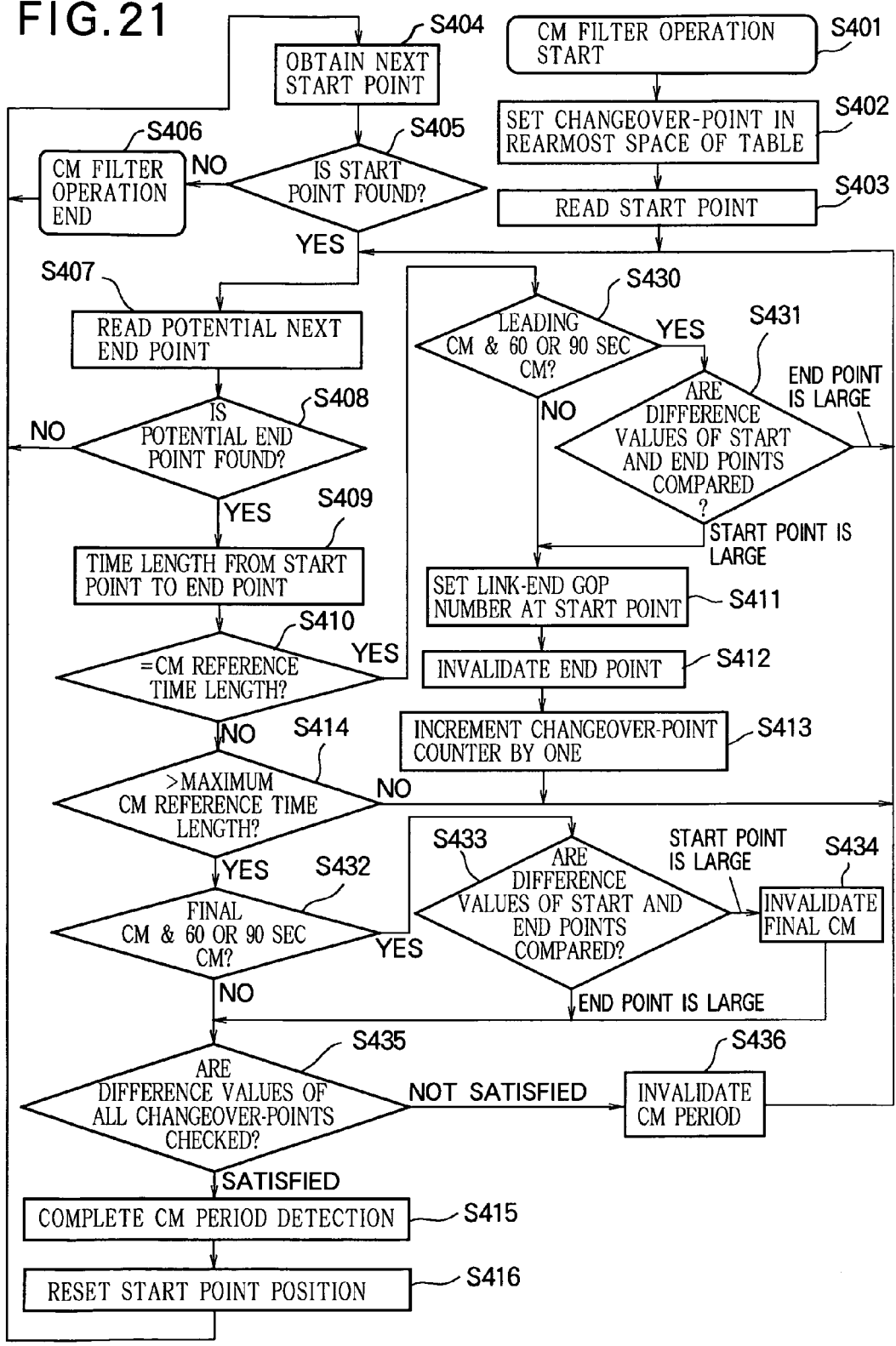
FIG. 21 is a flowchart showing the detecting processing processes of CM broadcast periods using a scene change difference value in a video audio recording apparatus according to the ninth embodiment of the present invention.
Figure 22:
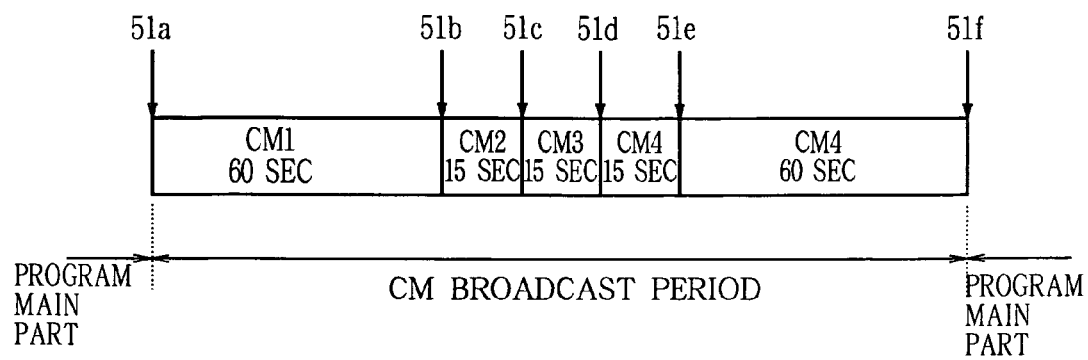
FIG. 22 is a diagram describing the detecting processing of CM broadcast periods using the scene change difference value in the video audio recording apparatus according to the ninth embodiment.

FIG. 21 is a flowchart showing a detection method of a CM broadcast period utilizing a scene change difference value in a video audio recording apparatus according to the ninth embodiment. Further, FIG. 22 is a diagram describing a CM broadcast period detection method utilizing a scene change difference value in the video audio recording apparatus according to the ninth embodiment. FIG. 22 shows the detected CM broadcast period and changeover-points $51a, \ldots, 51f$ placed in each CM boundaries in the CM broadcast period. In general, since a relationship in a video between a CM and a program main part or between CMs is weak, a change amount in the scene change is very large. In the ninth embodiment, a description will be made as to a method of reducing a false detection that regards a program main part as a CM erroneously, by using a fact that a scene change difference value between a CM and a program main part or between CMs, is larger than a scene change difference value in a program main part.

Figure 16:
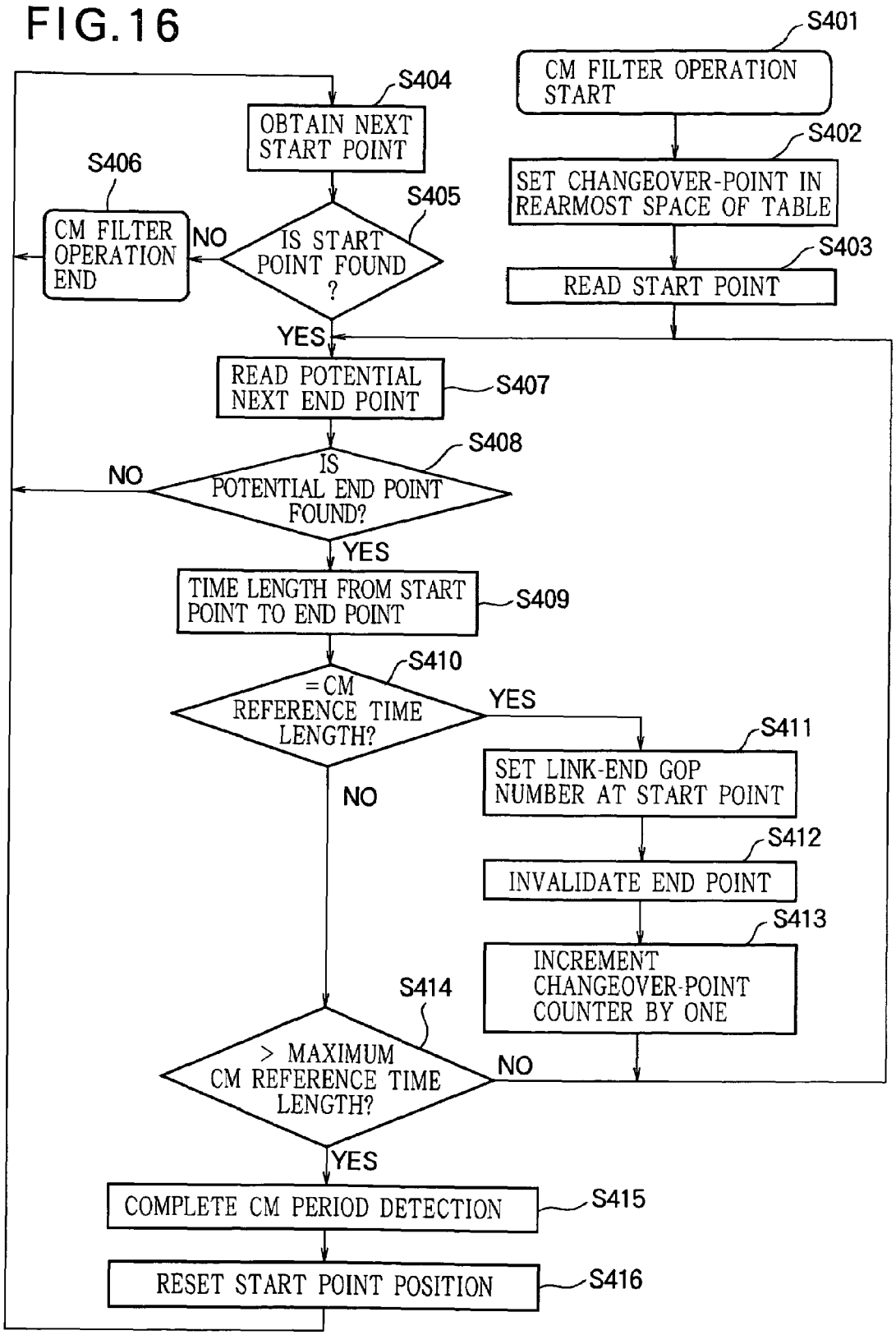
FIG. 16 is a flowchart showing the detecting processing of CM broadcast periods in the video audio recording apparatus according to the sixth embodiment.

Processing shown in the flowchart in FIG. 21 basically includes the processing in the flowchart in FIG. 16 of the sixth embodiment, and additionally includes some judgments and processing using a scene change difference value. In FIG. 21, steps that are the same as or correspond to the steps in FIG. 16 are assigned the same reference number or symbol.

First, after a judgment has been made that a time length from a changeover-point as a start point to a changeover-point as an end point is the same as the CM reference time length (e.g., 15 seconds, 30 seconds, 60 seconds, 90 seconds, or the like) (step S410), the CM filter 16 judges whether the start point and the end point belong to a leading CM, and the time length is 60 seconds or 90 seconds (step S430). If the condition is satisfied, a scene change difference value in the start point is compared with a scene change difference value in the end point (step S431). If the scene change difference value in the start point is larger, a judgment is made that CM starts from the start point position, and processing returns to step S411. In FIG. 22, a scene change difference value in the changeover-point $51a$ and a scene change difference value in the changeover-point $51b$ are compared, a judgment is made that a changeover-point having a larger scene change difference value is regarded as a boundary between a program main part and a CM.

On the other hand, if in step S431, the judgment is made that a scene change difference value in the end point is larger than a scene change difference value in the start point, the CM filter 16 determines that a CM starts from the end point position, that is, a program main part continues between the start point and the end point.

Similarly, the CM filter 16 judges whether it is the final CM and the time length is 60 seconds or 90 seconds when a CM is finished (step S432). If the condition is satisfied, a scene change difference value in the start point is compared with a scene change difference value in the end point (step S433). If the scene change difference value in the end point is larger than the scene change difference value in the start point, a judgment is made that the program main part starts from the end point position, and processing returns to step S435. FIG. 22 shows a case where a scene change difference value in the changeover-point 51e and a scene change difference value in the changeover-point 51f are compared with each other and the larger scene change difference value is regarded as a boundary between the CM and the program main part.

On the other hand, if the judgment is made that a scene change difference value in the start point is larger than a scene change difference value in the end point, the CM filter 16 determines a program main part starts from a start point position, that is, a period between the start point and the end point is already included in the program main part. As has mentioned above, if there is a CM, which is long, e.g., 60 seconds or 90 seconds at a beginning of a CM or a beginning of the program main part 60 seconds or 90 seconds and which broadcasting frequency is low, a boundary between a program main part and a CM is judged by whether a change amount of a video is larger before or after the period. A beginning or ending part of the program main part is sometimes a unit-of edition such as a block of episode or a single program corner, and in this case, it is a probability that the program main part is erroneously detected as a CM. In the detection method of the CM broadcast period of the ninth embodiment, by finding a CM boundary having a larger change amount of a video, a boundary between a CM and a program main part can be detected accurately.

Further, in step S435, the scene change difference values of all changeover-points are checked, are compared with the second threshold value that is larger than a threshold value used for the judging of a scene change. If a scene change difference value of at least one changeover-point in the CM broadcast periods exceeds the second threshold value, processing that it is treated as a CM broadcast period advances to step S415. In contrast, if not exceeds it, the CM broadcast period is treated as valid one (step S436). Referring to FIG. 14, if the threshold value of the scene change difference value is 0.9, the scene change difference values of the changeover-point 33b and 33g in the changeover-points 33b, 33c, 33f, and 33g exceed a threshold value 0.9. Therefore, a period between a changeover-point 33b and a changeover-point 33g is judged as a CM broadcast period.

As has been mentioned above, in a CM appearing in a boundary between a program main part and the CM, a scene change difference value is used for selecting the boundary between the program main part and the CM, a boundary between a program main part and a CM can be determined. Therefore, occurrence frequency of a false detection that a beginning or ending portion of a program main part is detected as a CM can be reduced.

Further, if in the detected CM broadcast period, at least one of the scene change difference values is not exceeds a certain threshold value, determination has been made that it is not a CM. Therefore, occurrence frequency of a false detection that a program main part having a smaller change amount in a video than that of a CM is detected as a CM can be reduced.

Furthermore, except for the above-described respects, the ninth embodiment is substantially the same as any of the sixth to eighth embodiments.

Tenth Embodiment

The tenth embodiment describes a method of detecting a fragmented CM with a period of several seconds, in a case where a head of the recorded stream is a CM with a period of several seconds and a part of the recorded stream succeeding the CM with a period of several seconds is a program main part. In general, since the video audio recording apparatus 20 requires a constant time from a decision of start of recording to an actual start of recording, there are proposed a lot of apparatuses that starts recording from several seconds before a previously established record start time. Further, a clock provided within the video audio recording apparatus does not always indicates a correct time. Therefore, for example, even when a broadcast program has a start time of PM 9:00 and a program main part starts at just PM 9:00, there is possibility that the fragmented CM is recorded in a leading portion of the recorded stream. The tenth embodiment indicates a method of extracting the fragmented CM recorded in a leading portion of the recorded stream.

Figure 23:
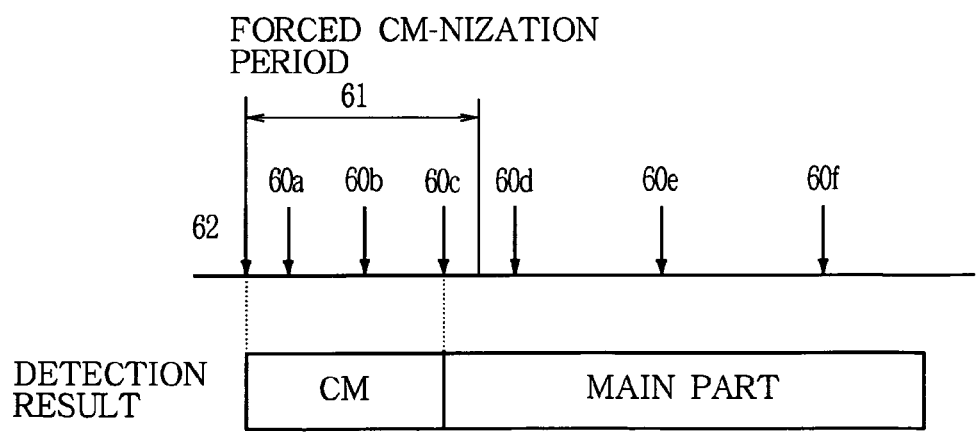
FIG. 23 is a diagram describing the processing of a video audio recording apparatus according to the tenth embodiment.

The tenth embodiment will be described with reference to FIG. 23. A changeover-point, in which both a scene change and a silence occur at the same time, is detected from the recorded stream. The last appearing changeover-point 60c in the forced CM-nization period 61 shown in FIG. 23 is judged as a boundary between a CM and a program main part, and a range between a record start point 62 and 60c is judged as CM. The forced CM-nization period is determined by the specification of the video audio recording apparatus. For example, in the case where the recording is started from 5 seconds before the record scheduled time, the forced CM-nization period is set to 5 seconds. Further, in consideration of an error of an internal clock provided within the video audio recording apparatus, for example, an error of 2 seconds, it may be set to 7 seconds. The reason why the last changeover-point 60c of the forced CM-nization period is adopted as a boundary between a CM and a program main part, is that the time length of the forced CM-nization period is set to be approximately the same as a difference between the record start time and the record scheduled time, and occurrence frequency of the changeover-points in CM is much higher than occurrence frequency of the changeover-points in the program main part.

According to the above points, since the recording is not started from just a previously established time record scheduled time, even if the video audio recording apparatus has a function of starting to record an unnecessary CM before the program main part, the apparatus can detect an unnecessary CM before the program main part.

Further, even if the internal clock provided within the video audio recording apparatus does not have a correct time, the apparatus can detect an unnecessary CM before the program main part.

Furthermore, in the tenth embodiment, the description has been made as to a method in which the last changeover-point in the forced CM-nization period is adopted as a boundary between the last CM and the program main part. However, the tenth embodiment can be modified so that a forced CM-nization time, which is a time after a certain seconds, for example, 5 seconds from a record start time, is used in replace of the forced CM-nization period, and a changeover-point nearest to the forced CM-nization time is adopted as a boundary between the CM and the program main part. In FIG. 23, this method is one in which the point 60d is adopted as a boundary a CM and a program main part.

Moreover, it is possible to detect a CM broadcast period by selectively combining constituent elements described in the sixth to tenth embodiments.

What is claimed is:

1. A video audio recording apparatus comprising:
   a record means which records an encoded stream of a video and an audio;
   a stream hold means which temporarily stores the encoded stream before recording the encoded stream in the record means;
   an image-change-point detection means which detects a scene change from video data of the encoded stream stored in the stream hold means;
   a silence detection means which detects a silence and a time length of the silence from an audio signal;
   a temporary storage means which temporarily holds the scene change information detected by the image-change-point detection means and the silence information detected by the silence detection means;
   a changeover-point detection means which detects a changeover-point, at which both the scene change and the silence occur at the same time from the scene change information and the silence information held by the temporary storage means;
   a CM-broadcast-period determination means which judges a particular period of time when two or more potential CMs are successively detected as a CM broadcast period, each potential CM being an interval between two successive changeover-points detected by the changeover-point detection means which coincides with one of a plurality of predetermined CM reference times, wherein:
      an interval between two successive changeover-points coincides with a predetermined CM reference time by falling within a predetermined range whose mean value equals the predetermined CM reference time, and
      for a changeover-point that separates two successively-detected potential CMs within the particular period of time, the CM-broadcast-period determination means compares the detected silence time length of the changeover-point to a prescribed silence time range separating CMs, and performs the following based on the comparison:
         judges that the changeover-point separates two CMs if the detected silence time length is within the prescribed silence time range, and
         judges that the changeover-point separates a CM from a main program if the detected silence time length is not within the prescribed silence time range; and
   a CM-broadcast-period-information record means which records time information of the CM broadcast period determined by the CM-broadcast-period determination means.

2. The video audio recording apparatus according to claim 1, wherein:
   in a case where a plurality of the changeover-points are detected within the predetermined time range, the central part of which is the predetermined reference period of time used by the CM-broadcast-period determination means,
   when an interval between changeover-points judged immediately before by the CM-broadcast-period determination means is longer by a first value than one of the predetermined CM reference times, the CM-broadcast-period determination means preferentially selects a changeover-point, which causes an interval between changeover-points judged next by the CM-broadcast-period determination means to be shorter by the first value than the predetermined CM reference time, as a changeover-point for defining a CM broadcast period, and
   when an interval between changeover-points judged immediately before by the CM-broadcast-period determination means is shorter by a second value than one of the predetermined CM reference times, the CM-broadcast-period determination means preferentially selects a changeover-point, which causes an interval between changeover-points judged next by the CM-broadcast-period determination means to be longer by the second value than the predetermined CM reference time, as a changeover-point for defining a CM broadcast period.

3. The video audio recording apparatus according to claim 1, wherein, when a plurality of the changeover-points are detected within a predetermined range whose mean value equals one of the predetermined CM reference times, used by the CM-broadcast-period determination means, the CM-broadcast-period determination means judges a changeover-point, which causes a CM broadcast period judged by the CM-broadcast-period determination means to be closest to an integral multiple of the predetermined CM reference period of time, as a changeover-point for defining a CM broadcast period.

4. A video audio recording method comprising the steps of:
   recording an encoded stream of a video and an audio in a record means;
   storing the encoded stream in a stream hold means before recording the encoded stream in the record means;
   detecting, by an image-change-point detection means, a scene change from video data of the encoded stream stored in the stream hold means;
   detecting, by a silence detection means, a silence and a time length of the silence from an audio signal;
   temporarily holding the scene change information detected by the image-change-point detection means and the silence information detected by the silence detection means in a temporary storage means;
   detecting, by a changeover-point detection means, a changeover-point, at which both the scene change and the silence occur at the same time from the scene change information and the silence information held by the temporary storage means;
   judging, by a CM-broadcast-period determination means, a particular period of time when two or more potential CMs are successively detected as a CM broadcast period, each potential CM being an interval between two successive changeover-points detected by the changeover-point detection means which coincides with one of a plurality of predetermined CM times, wherein:
      an interval between two successive changeover-points coincides with a predetermined reference time by falling within a predetermined range whose mean value equals the predetermined CM reference time, and
      for a changeover-point that separates two successively-detected potential CMs within the particular period of time, the detected silence time length is compared to a prescribed silence time range separating CMs, and the following is performed based on the comparison:

the changeover-point is judged to separate tow CMs if the detected silence time length is within the prescribed silence time range, and the changeover-point is judged to separate a CM from a main program if the detected silence time length is not within the prescribed silence time range; and recording time information of the CM broadcast period determined by the CM-broadcast-period determination means in a CM-broadcast-period-information record means.

5. The video audio recording method according to claim 4, wherein:

in a case where a plurality of the changeover-points are detected within the predetermined time range, the central part of which is the predetermined reference period of time used by the CM-broadcast-period determination means, when an interval between changeover-points judged immediately before by the CM-broadcast-period determination means is longer by a first value than one of the predetermined CM reference times, the CM-broadcast-period determination means preferentially selects a changeover-point, which causes an interval between changeover-points judged next by the CM-broadcast-period determination means to be shorter by the first value than the CM reference time, as a changeover-point for defining a CM broadcast period, and when an interval between changeover-points judged immediately before by the CM-broadcast-period determination means is shorter by a second value than one of the predetermined CM reference times, the CM-broadcast-period determination means preferentially selects a changeover-point, which causes an interval between changeover-points judged next by the CM-broadcast-period determination means to be longer by the second value than the predetermined CM reference time, as a changeover-point for defining a CM broadcast period.

6. The video audio recording method according to claim 4, wherein, when a plurality of the changeover-points are detected within a predetermined range whose mean value equals one of the predetermined CM reference times, used by the CM-broadcast-period determination means, the CM-broadcast-period determination means judges a changeover-point, which causes a CM broadcast period judged by the CM-broadcast-period determination means to be closest to an integral multiple of the predetermined CM reference time, as a changeover-point for defining a CM broadcast period.

7. The video audio recording method according to claim 4, wherein, in the step of recording time information of the CM broadcast period in the CM broadcast period record means, when the changeover-points in the CM broadcast period detected by the CM-broadcast-period determination means does not include a changeover-point with a detected silence time length within a second prescribed silence time range, the CM broadcast period determined is not recorded in the CM broadcast period record means.

8. The video audio recording method according to claim 4, wherein, in the step of judging the CM broadcast period, a period of time until a changeover-point that occurred last, of the changeover-points detected within a prescribed period of time from a start of recording of a stream by the changeover-point detection means is judged as the CM broadcast.

* * * * *